US012747747B2

(12) United States Patent
Yen

(10) Patent No.: US 12,747,747 B2
(45) Date of Patent: Sep. 29, 2026

(54) LOCKBOLT WITH SWAGE COLLAR

(71) Applicant: Chun-Ju Yen, Kaohsiung (TW)

(72) Inventor: Chun-Ju Yen, Kaohsiung (TW)

( * ) Notice: Subject to any disclaimer, the term of this patent is extended or adjusted under 35 U.S.C. 154(b) by 406 days.

(21) Appl. No.: 18/400,426

(22) Filed: Dec. 29, 2023

(65) Prior Publication Data

US 2025/0215915 A1 Jul. 3, 2025

(51) Int. Cl.
*F16B 19/05* (2006.01)

(52) U.S. Cl.
CPC .................................... *F16B 19/05* (2013.01)

(58) Field of Classification Search
CPC ......... F16B 19/05; F16B 2200/83; H01F 7/00
USPC .......................................................... 411/361
See application file for complete search history.

(56) References Cited

U.S. PATENT DOCUMENTS 3,215,024 A * 11/1965 Brilmyer ................ B21J 15/022 411/361
3,255,799 A * 6/1966 Heimovics ............ F16B 5/0208 411/361
3,371,572 A * 3/1968 King, Jr. ................. F16B 19/05 29/517
4,012,885 A * 3/1977 King, Jr. ................. F16B 4/004 411/366.1
4,054,045 A * 10/1977 King, Jr. ................. F16B 19/05 72/46
4,136,596 A * 1/1979 Davis, Jr. ................ F16B 19/05 411/548
4,208,943 A * 6/1980 Smith ...................... F16B 19/05 411/361
4,342,529 A * 8/1982 Smith ...................... F16B 19/05 411/361
4,437,805 A * 3/1984 Smith ...................... F16B 19/05 411/361
4,531,871 A * 7/1985 Sigmund ................. F16B 19/05 411/361
4,653,969 A * 3/1987 Summerlin ............. F16B 19/05 411/361
4,717,300 A * 1/1988 Alvi ......................... F16B 19/05 148/226
8,312,606 B2 * 11/2012 Reid ....................... B21J 15/147 411/361
8,434,984 B2 * 5/2013 Toosky ................... F16B 19/05 411/362
9,732,783 B2 * 8/2017 Lee ......................... F16B 39/282
2010/0040410 A1 * 2/2010 King ...................... A47C 17/86 403/361
2011/0058916 A1 * 3/2011 Toosky ................... F16B 19/10 411/360

(Continued)

*Primary Examiner* — Nicholas L Foster

(57) ABSTRACT

A fastening assembly includes a lockbolt, a swage collar, and a magnetic washer having a circular arc angle. The lockbolt includes a lockbolt head and a shank. The shank includes a grip section, a groove section, and a pull section having a reverse tapered surface. The lockbolt head is connected to one side of the grip section of the shank. An end surface of the lockbolt head connected to one side of the shank has a circular arc surface. The grip section is a portion of the shank close to the lockbolt head. The groove section is disposed on the shank and connected to the grip section. The pull section has a reverse tapered surface disposed on the shank and connected to the groove section. The swage collar includes a through hole matching the lockbolt, a swage collar body, and a protruding edge structure.

3 Claims, 27 Drawing Sheets

(56) References Cited

U.S. PATENT DOCUMENTS

| | | | | |
|---|---|---|---|---|
| 2016/0160904 | A1* | 6/2016 | Lee | F16B 39/282 411/332 |
| 2017/0350147 | A1* | 12/2017 | Janko | E04F 13/072 |

* cited by examiner

LOCKBOLT WITH SWAGE COLLAR

FIELD OF THE INVENTION

The invention relates to lockbolts and more particularly to a lockbolt with a swage collar having an embossed structure and longitudinal restraint and construction method thereof.

BACKGROUND OF THE INVENTION

A fastening assembly of the prior art overall has a relatively longer lockbolt. Due to the fact that the gripping force of the pull section of the lockbolt of the prior art for pulling is insufficient, the gripping force can be improved by increasing the length of the pull section of the prior art. As a result, the overall length of the lockbolt of the prior art becomes longer and, therefore, the manufacturing cost is higher.

The lockbolt and the swage collar of the fastening assembly of the prior art are unable to fasten the fastening assembly into objects to be mounted, in various directions during the preassembling step or the installing step. The initial design of the swage collar of the fastening assembly of the prior art does not consider that conditions that the lockbolt and the swage collar are not pre-fastened on to the objects during the preassembling step or the installing step. As a result, lockbolts and swage collars of the fastening assemblies of the prior art will simply fall off while being used to fasten objects to be mounted in various directions.

In view of the aforementioned problem, the inventor of the invention investigated the aforementioned deficiency and searched intensively for the solutions thereof based on years of experience of research and development in relevant fields. After a long period of time of research and many experiments, the invention is completed.

SUMMARY OF THE INVENTION

It is therefore one object of the invention to provide a fastening assembly, comprising a lockbolt, a swage collar, and a magnetic washer having a circular arc angle, wherein: the lockbolt comprises a lockbolt head and a shank having a diameter of d, the shank including a grip section, a groove section, and a pull section having a reverse tapered surface; the lockbolt head is connected to one side of the grip section; and an end surface of the lockbolt head is connected to one side of the shank and has a circular arc surface with a radius of R; the grip section is a portion of the shank close to the lockbolt head; the groove section is disposed on the shank and connected to the grip section; the groove section has a diameter of d-d/8 to d-d/16; the groove section is configured with offset-style radial annular groove portions and a separate axial line-style slot structure; the separate axial line-style slot structure has four air slots that are 90° apart; and the groove section has a groove depth of d/48 to d/32; the pull section having the reverse tapered surface is disposed on the shank and connected to the groove section; the pull section having the reverse tapered surface that is a conical structure, which has a reverse tapered surface angle of 3° to 8°, and is configured with a structure of annular grooves having the reverse tapered surface; the structure of the annular grooves having the reverse tapered surface increases the gripping force during a pulling process; a length of the pull section having the reverse tapered surface is reduced while the gripping force of the pull section having the reverse tapered surface remains unchanged; the overall length of the lockbolt is reduced; and a production cost is also reduced; the swage collar comprises a through hole that matches and is plugged with the lockbolt, a swage collar body, and a protruding edge structure; and the magnetic washer having the circular arc angle has a through hole that matches and fits onto the lockbolt; one side of the magnetic washer has the circular arc surface with a radius of R that engages and joins with the circular arc surface with the radius R of the lockbolt head; and the magnetic washer is configured to calibrate a deviation, caused by an eccentric force created during the pulling step, through the circular arc surface of the radius R thereof.

The above and other objects, features and advantages of the invention will become apparent from the following detailed description taken with the accompanying drawings

DETAILED DESCRIPTION OF THE INVENTION

Figure 1:
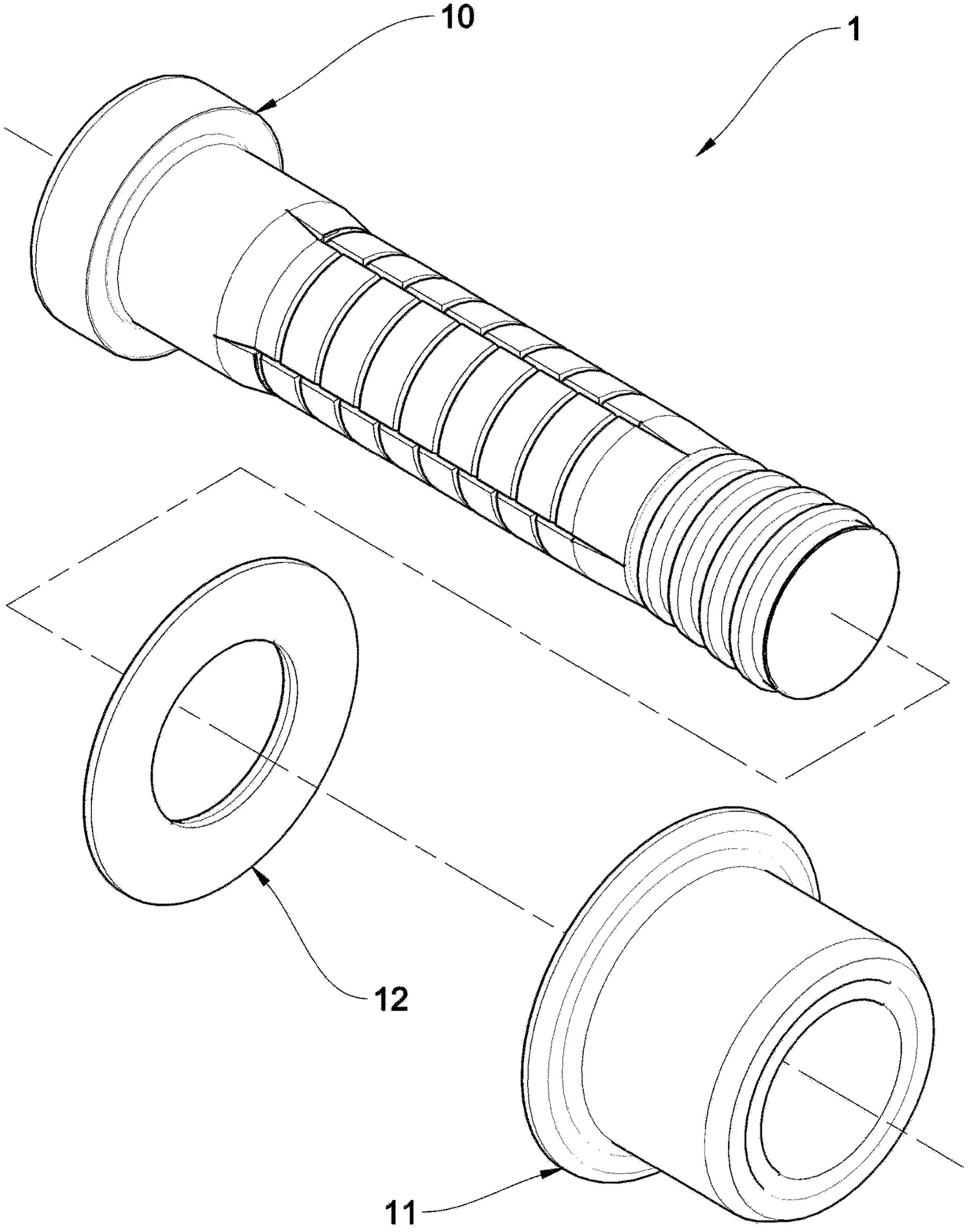
FIG. 1 is a perspective exploded view of a fastening assembly of the invention.
Figure 2:
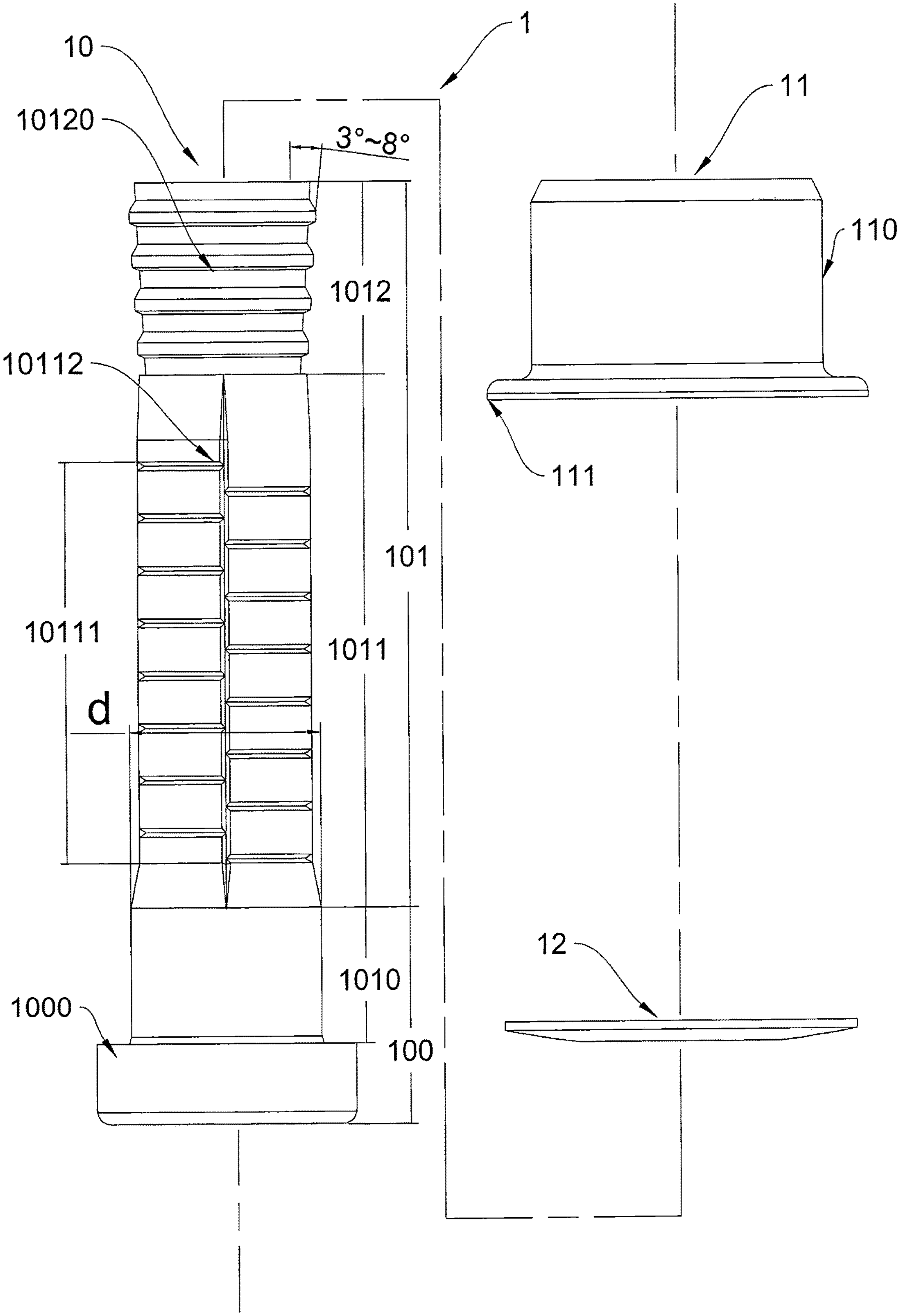
FIG. 2 is an exploded view of the front view of the fastening assembly of the invention.
Figure 3:
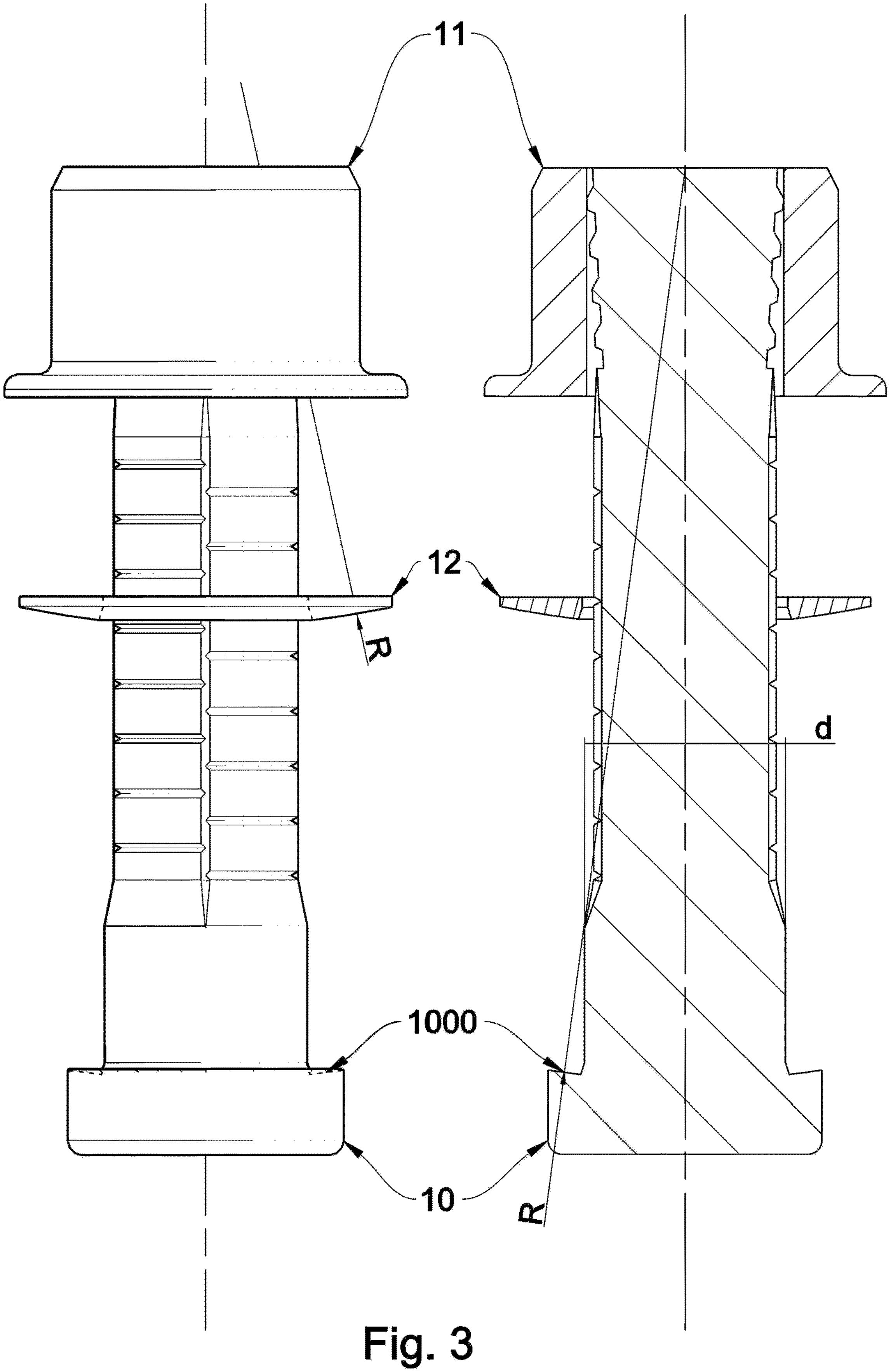
FIG. 3 is a composite view of the front and sectional view of the fastening assembly of the invention.

Please refer to FIG. 1, FIG. 2, and FIG. 3. FIG. 1 is a perspective exploded view of a fastening assembly 1 of the invention; FIG. 2 is an exploded view of the front view of the fastening assembly 1 of the invention; and FIG. 3 is a composite view of the front and sectional view of the fastening assembly 1 of the invention.

As shown in FIG. 1, the invention relates to a type of the fastening assembly 1, comprising a lockbolt 10, a swage collar 11, and a magnetic washer having a circular arc angle 12.

As shown in FIG. 2, the lockbolt 10 of the invention comprises a lockbolt head 100 and a shank 101, wherein the shank 101 comprises a grip section 1010, a groove section 1011, and a pull section having a reverse tapered surface 1012; and the shank diameter is d.

The lockbolt head 100 is connected to one side of the grip section 1010 of the shank 101; the end surface of the lockbolt head 100 that is connected with one side of the shank 101 has a circular arc surface with a radius of R.

The grip section 1010 is the portion of shank 101 close to the lockbolt head 100. The groove section 1011 is disposed on the shank 101 and connected with the grip section 1010; the diameter of the groove section 1011 can be d-d/8-d-d/16. The groove section 1011 is configured with offset-style radial annular groove portions 10111 and an axial line-style slot structure 10112 separately. The axial line-style slot structure 10112 has four air slots that are 90° apart; the groove depth of the groove section can be d/48-d/32.

The pull section has a reverse tapered surface 1012 which is disposed on the shank 101 and connected with the groove section 1011; the pull section having a reverse tapered surface 1012 is a conical structure, which has a reverse tapered surface angle of 3°-8°, and is configured with a structure of annular grooves having a reverse tapered surface 10120. The annular grooves having a reverse tapered surface 10120 can increase the gripping force during the pulling process.

Owing to such a design, the length of the pull section having a reverse tapered surface 1012 can be reduced while the gripping force of the pull section having a reverse tapered surface 1012 of the lockbolt 10 remains unchanged. As a result, the overall length of the lockbolt 10 is reduced and the production cost is also reduced effectively.

As shown in FIG. 2 and FIG. 3, the swage collar 11 of the invention comprises a through hole that can match and be plugged with the lockbolt, a swage collar body 110, and a protruding edge structure 111.

As shown in FIG. 2 and FIG. 3, the magnetic washer having a circular arc angle 12 has a through hole that can match and fit onto the lockbolt, wherein one side of the washer has a circular arc surface with a radius of R that can engage and join with the circular arc surface with a radius of R of the lockbolt head 100, and can automatically calibrate the deviation, caused by the eccentric force created during the pulling step, through the circular arc surface of radius R thereof.

Figure 4:
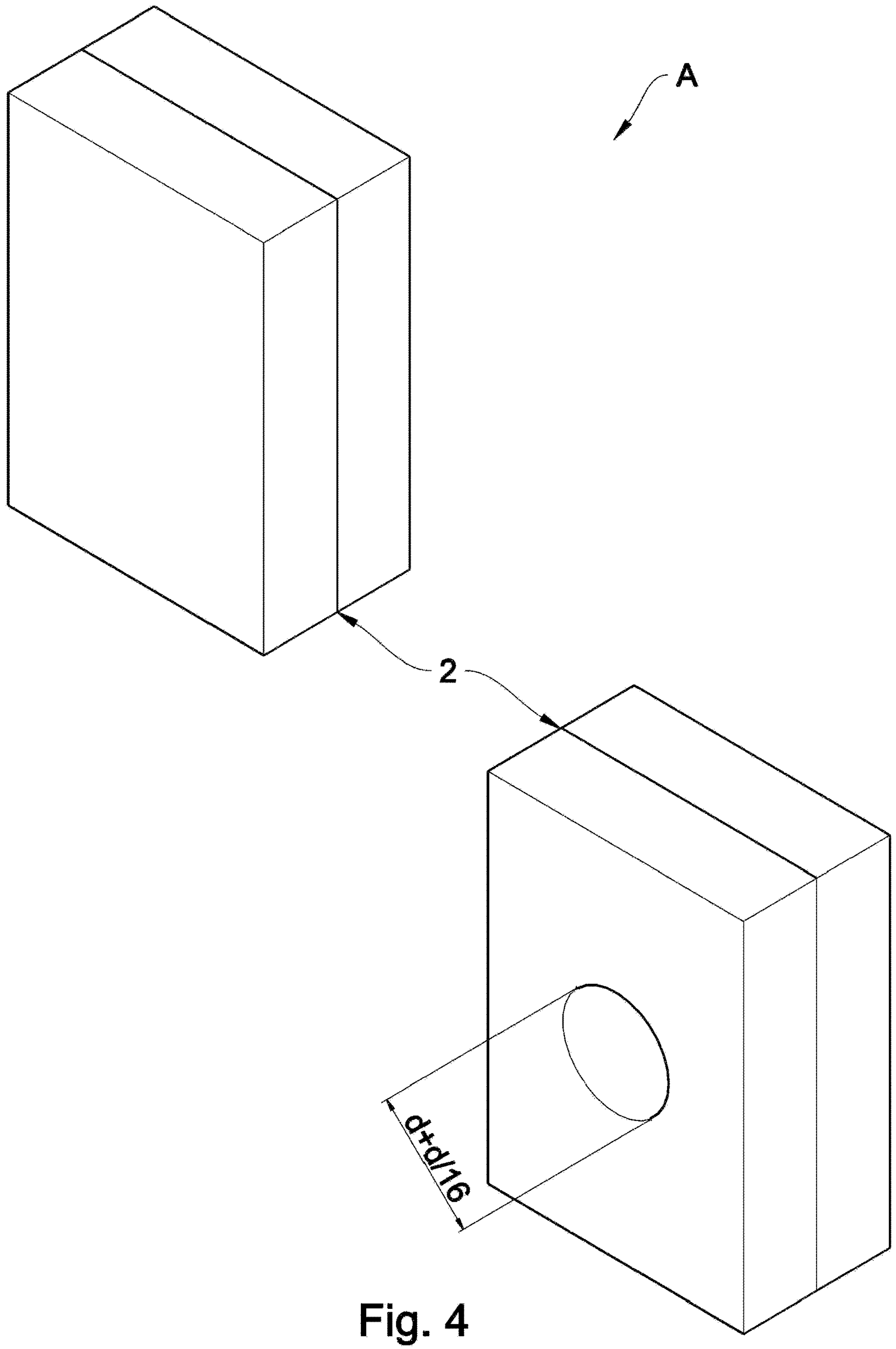
FIG. 4 is a schematic view of the drilling step A of the invention.

Please refer to FIG. 4. FIG. 4 is a schematic view of the drilling step A of the invention. As shown in FIG. 4, the drilling step A of the invention drills a hole of drill aperture d+d/16 in the object to be mounted 2, a hole slightly larger than the shank 101 of a shank diameter d.

Figure 5:
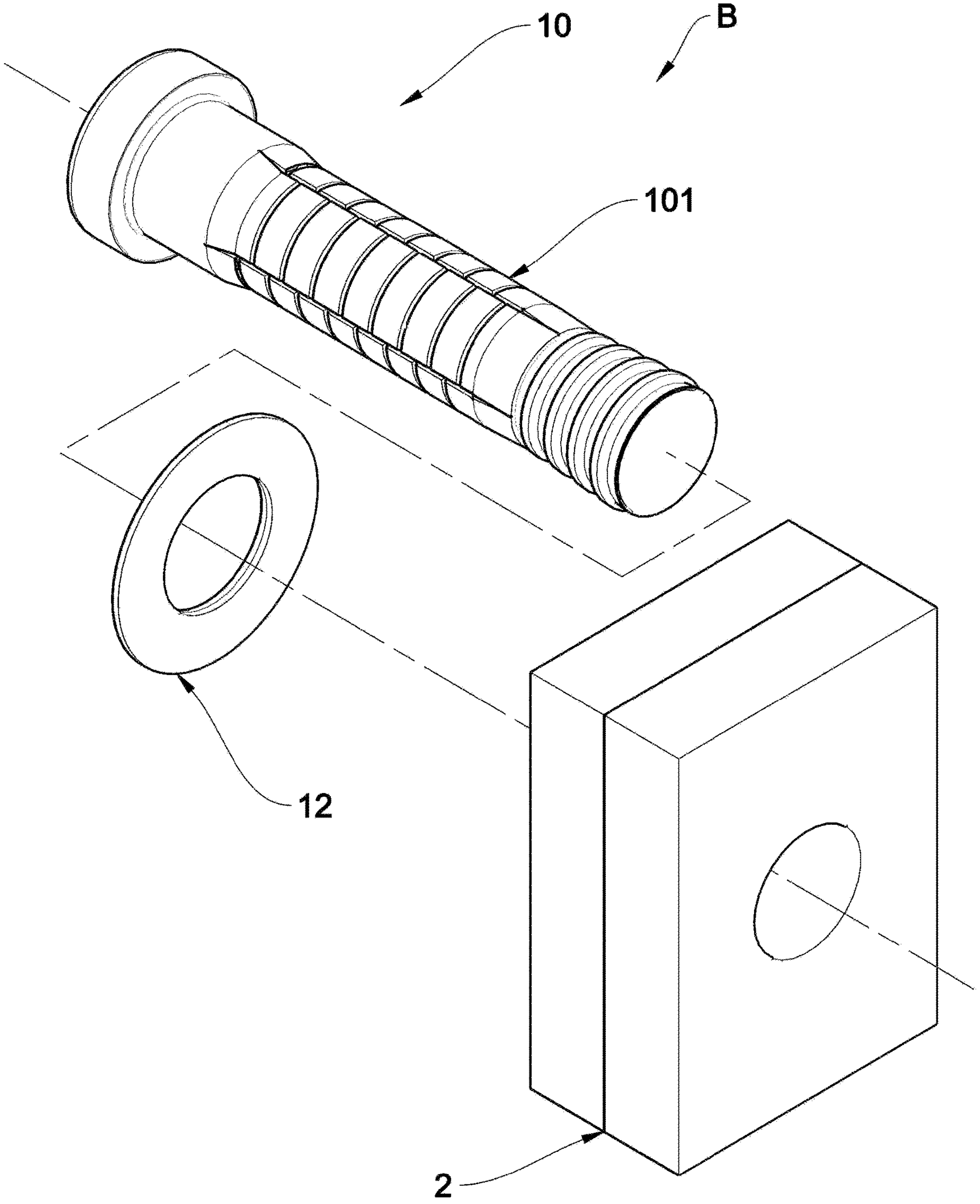
FIG. 5 is a schematic view of the preassembling step B of the first preferred embodiment of the invention.

Please refer to FIG. 5. FIG. 5 is a schematic view of the preassembling step B of the first preferred embodiment of the invention. As shown in FIG. 5, the preassembling step B of the first preferred embodiment of the invention is to insert the lockbolt 10 from the side of the shank 101, which faces the side of the circular arc surface of the magnetic washer having a circular arc angle 12, into the magnetic washer having a circular arc angle 12, to form the fastening assembly 1 of the invention. Next, the preassembled fastening assembly 1 is inserted into the pre-drilled hole of the object to be mounted 2 created from the drilling step A.

Figure 6:
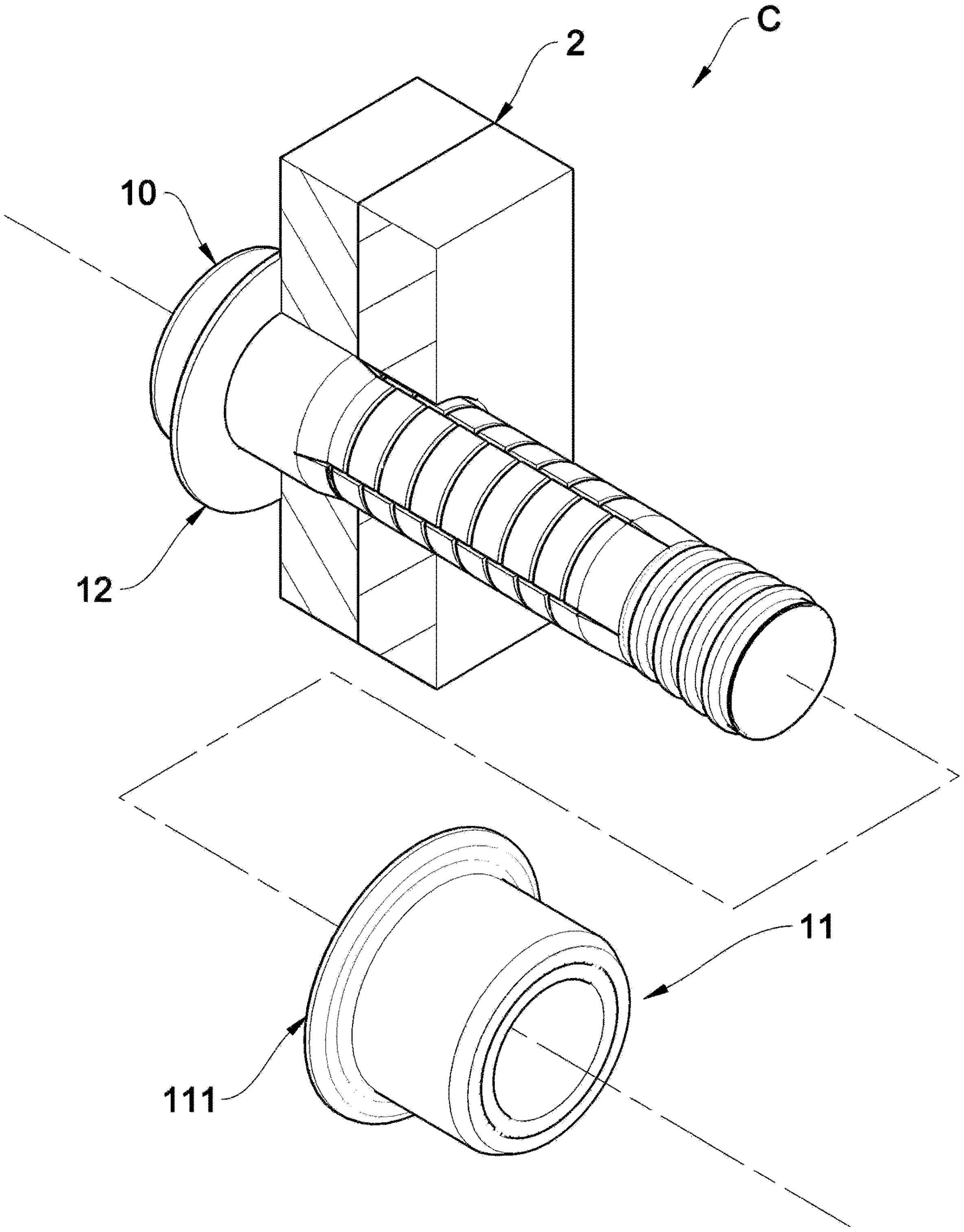
FIG. 6 is a schematic view of the installing step C of the first preferred embodiment of the invention.

Please refer to FIG. 6. FIG. 6 is a schematic view of the installing step C of the first preferred embodiment of the invention. As shown in FIG. 6, the installing step C of the first preferred embodiment of the invention is to insert the swage collar 11, having the protruding edge structure 111 at the end, into the lockbolt 10 after the preassembling step.

Figure 7:
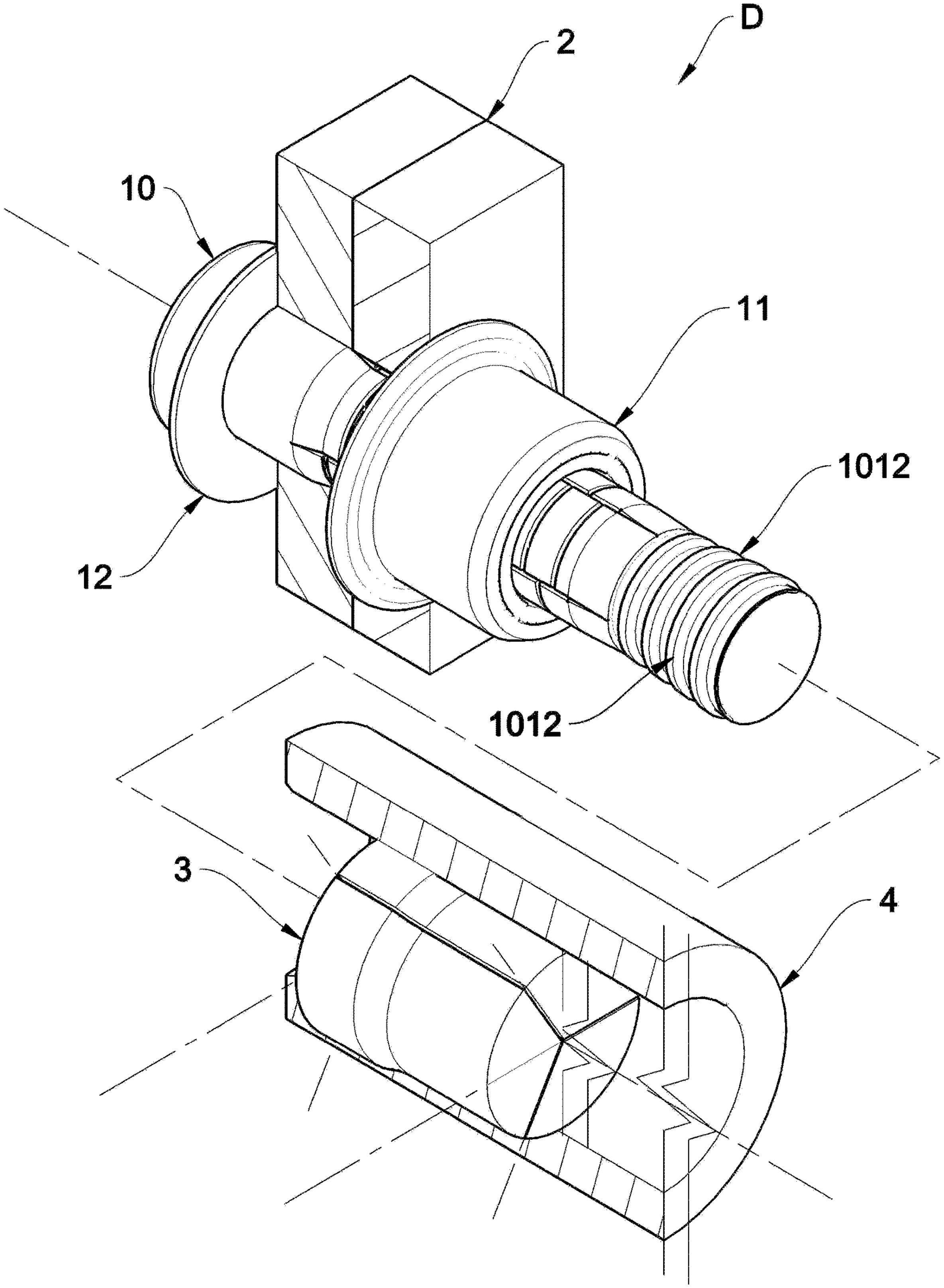
FIG. 7 is a schematic view of the gripping step D of the first preferred embodiment of the invention.
Figure 8:
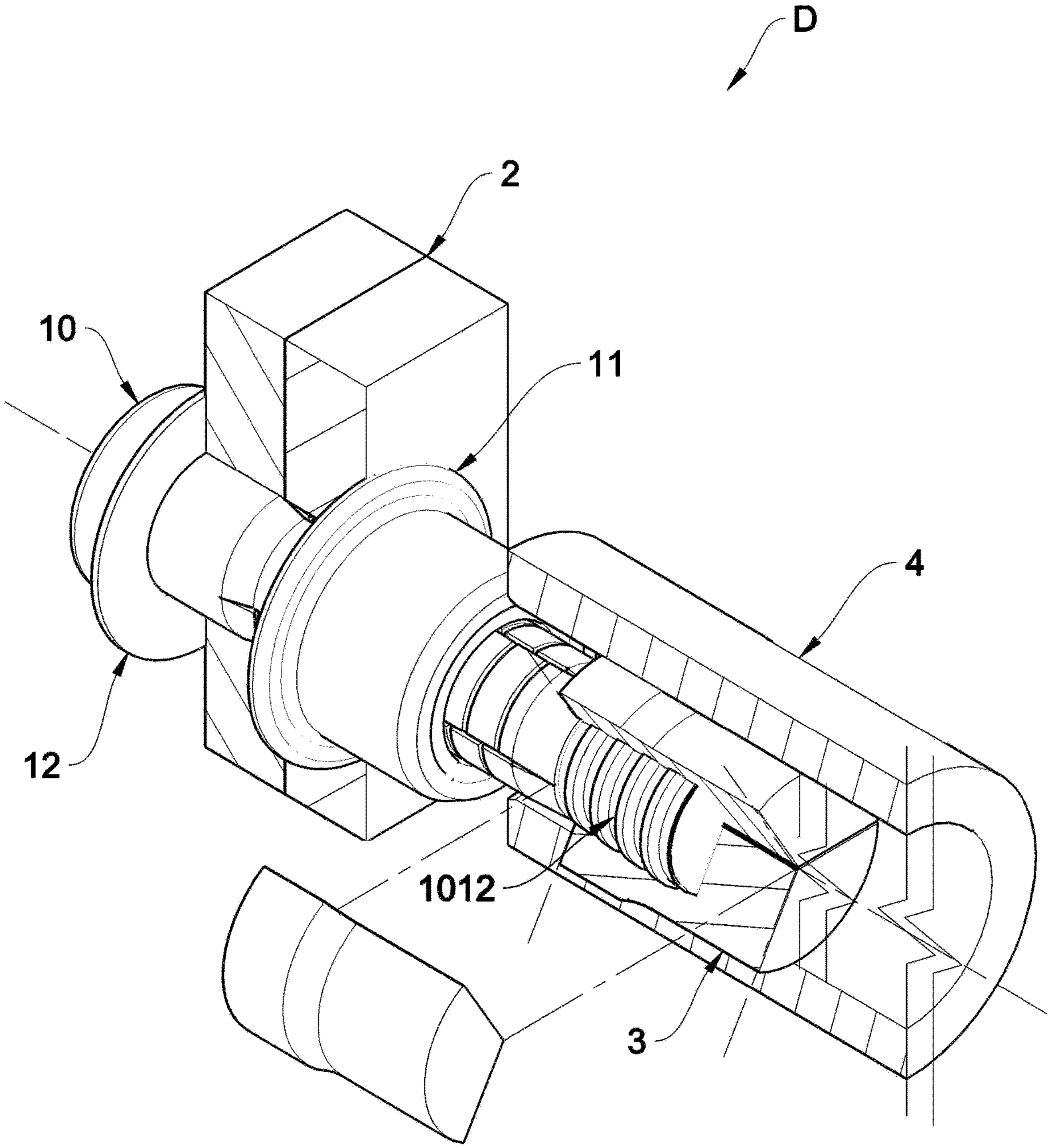
FIG. 8 is a schematic view of the gripping step D of the first preferred embodiment of the invention.

Please refer to FIG. 7 and FIG. 8. Both FIG. 7 and FIG. 8 are a schematic view of the gripping step D of the first preferred embodiment of the invention separately. As shown in FIG. 7 and FIG. 8, the gripping step D of the first preferred embodiment of the invention is to place a pull fixture 3 and a pull sleeve 4 onto the pull section having a reverse tapered surface 1012 of the lockbolt 10, described in the aforementioned installing step, to which the pull fixture 3 and the pull sleeve 4 hold on.

Figure 9:
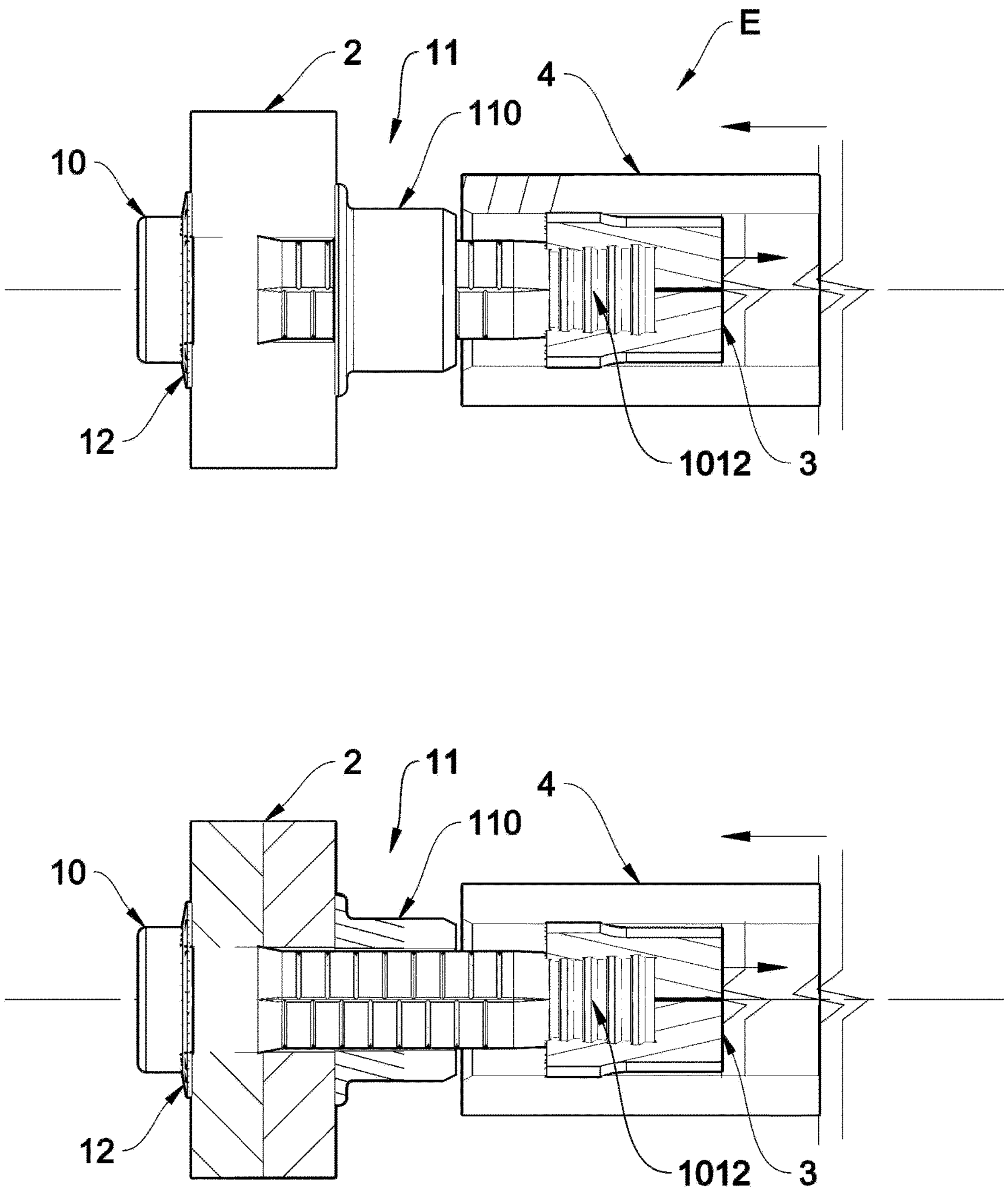
FIG. 9 is a schematic view of the pulling step E of the first preferred embodiment of the invention.
Figure 10:
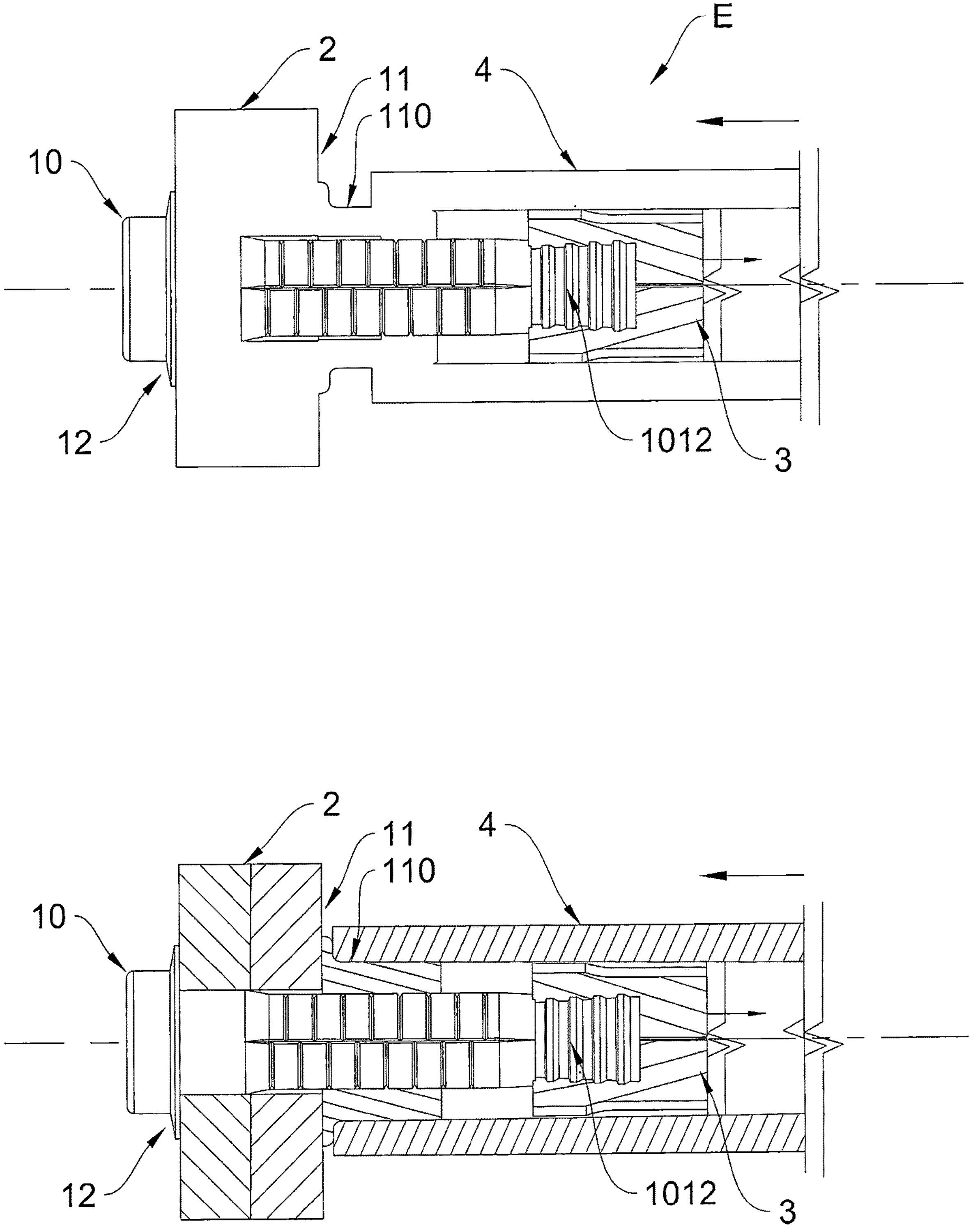
FIG. 10 is a schematic view of the pulling step E of the first preferred embodiment of the invention.

Please refer to FIG. 9 and FIG. 10. Both FIG. 9 and FIG. 10 are a schematic view of the pulling step E of the first preferred embodiment of the invention separately. A shown in FIG. 9 and FIG. 10, the pulling step E of the first preferred embodiment of the invention is to plug and secure the swage collar body 110 of the swage collar 11 of the fastening assembly 1 into the object to be mounted, which has been drilled with a through hole during the aforementioned drilling step A, by applying force in the axial direction toward the object to be mounted through the pull sleeve 4. At the same time, the pull fixture 3 is used to grip the pull section having a reverse tapered surface 1012 of the lockbolt and applies force in the opposite direction of the swage collar 11, causing strain effects of the swage collar body 110 of the swage collar 11 that eventually have the object to be mounted 2 securely fastened.

A fixture of a blind rivet, comprising a pull fixture and a pull sleeve, wherein the pull fixture comprises a set of 3-segment assembled parts, having an annular protruding edge structure on the inner surface thereof that can grip the pull section of the lockbolt; and the pull sleeve has a hollow sleeve structure and the pull fixture can be placed within the hollow sleeve structure of the pull sleeve; the pull sleeve is used in the pulling step E to apply force that causes strain effects of the rivet body making the object to be mounted securely fastened.

Figure 11:
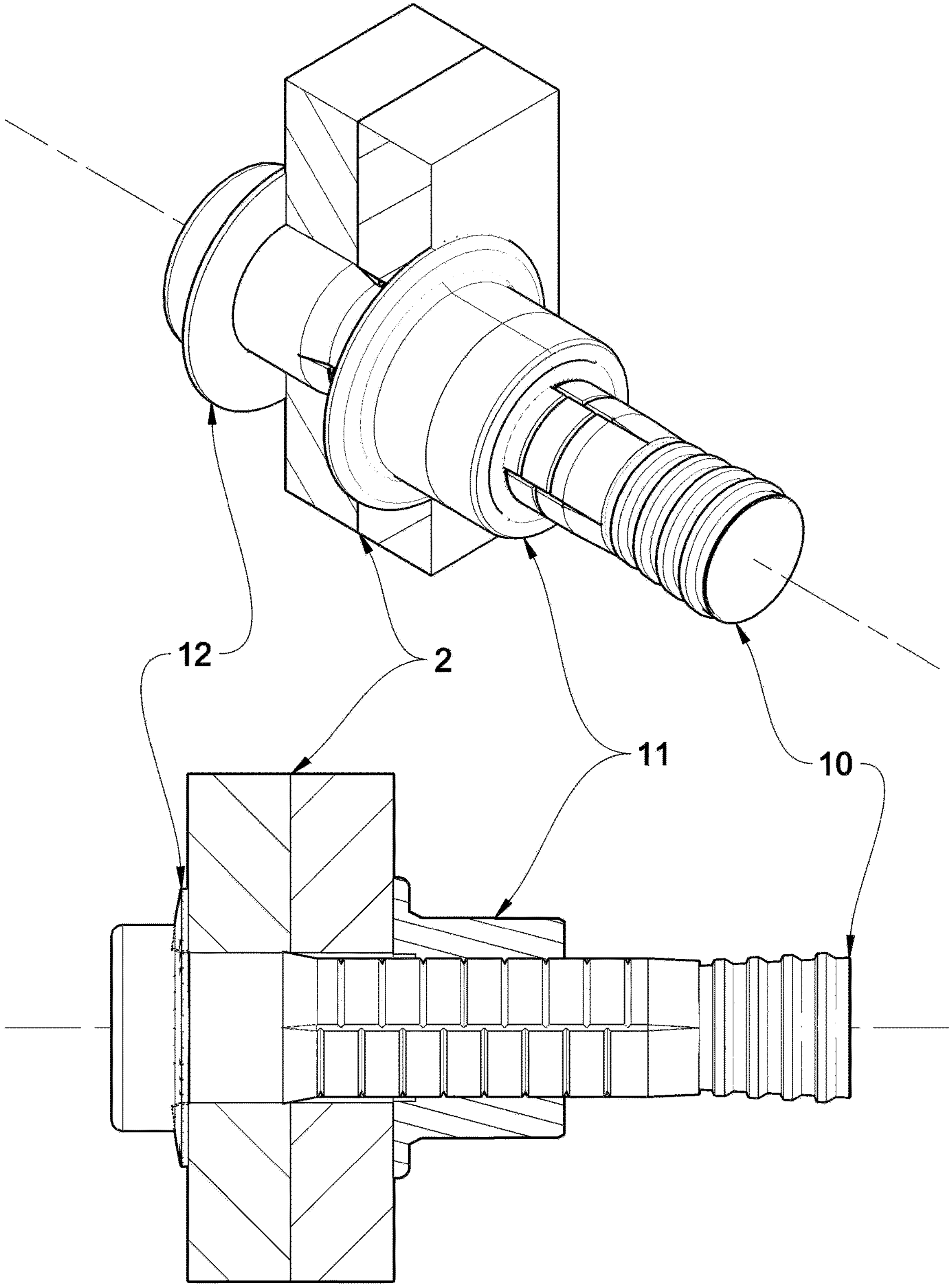
FIG. 11 is a schematic view upon completion of the pulling step of the first preferred embodiment of the invention.

Please refer to FIG. 11. FIG. 11 is a schematic view upon completion of the pulling step E of the first preferred embodiment of the invention. As shown in FIG. 11, the fastening assembly 1 of the first preferred embodiment of the invention can be applied in securing objects to be mounted 2. According to FIG. 11, the fastening assembly 1 of the invention is a locking method for a permanent joint.

Figure 12:
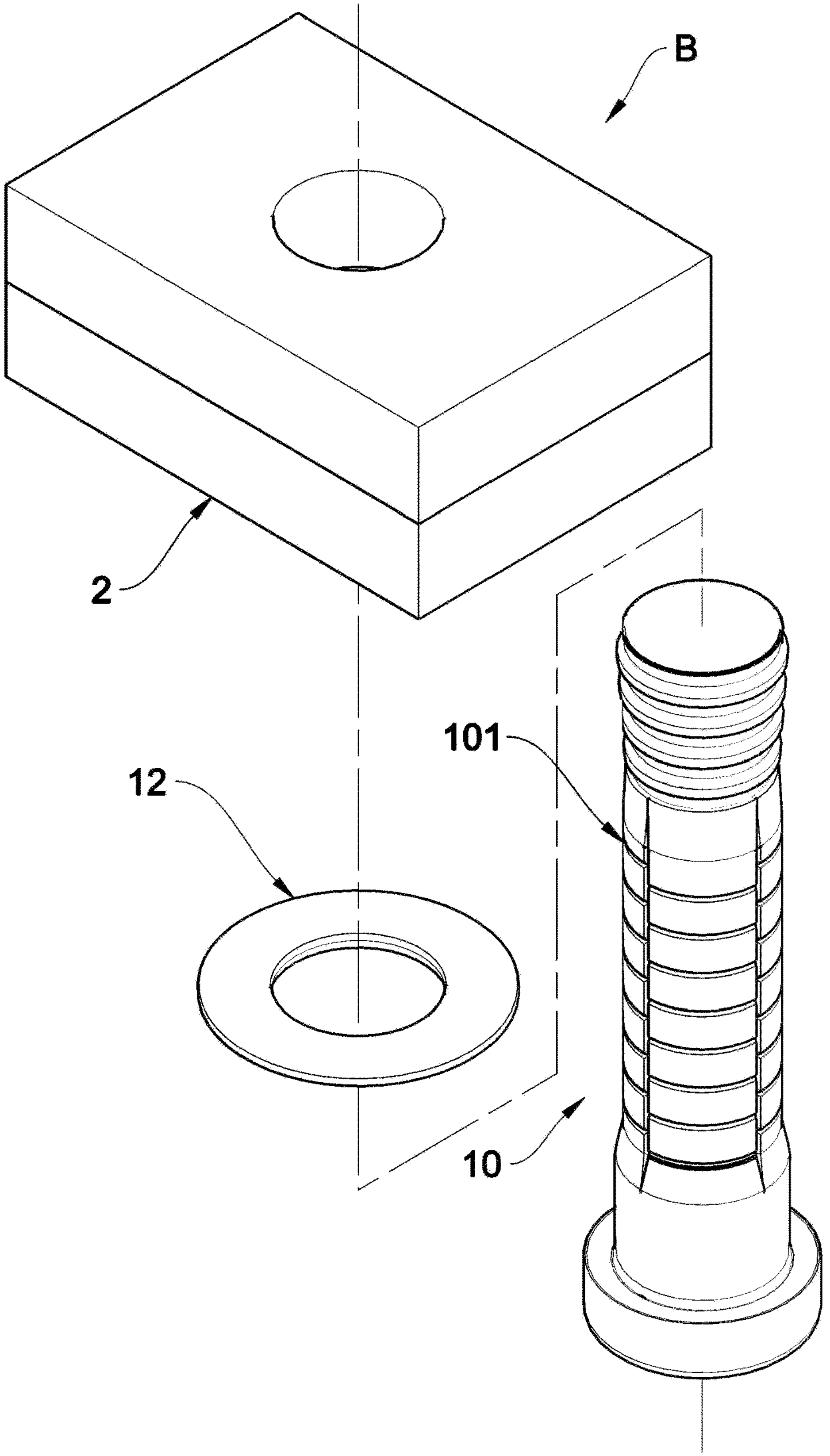
FIG. 12 is a schematic view of the preassembling step B of the second preferred embodiment of the invention.
Figure 13:
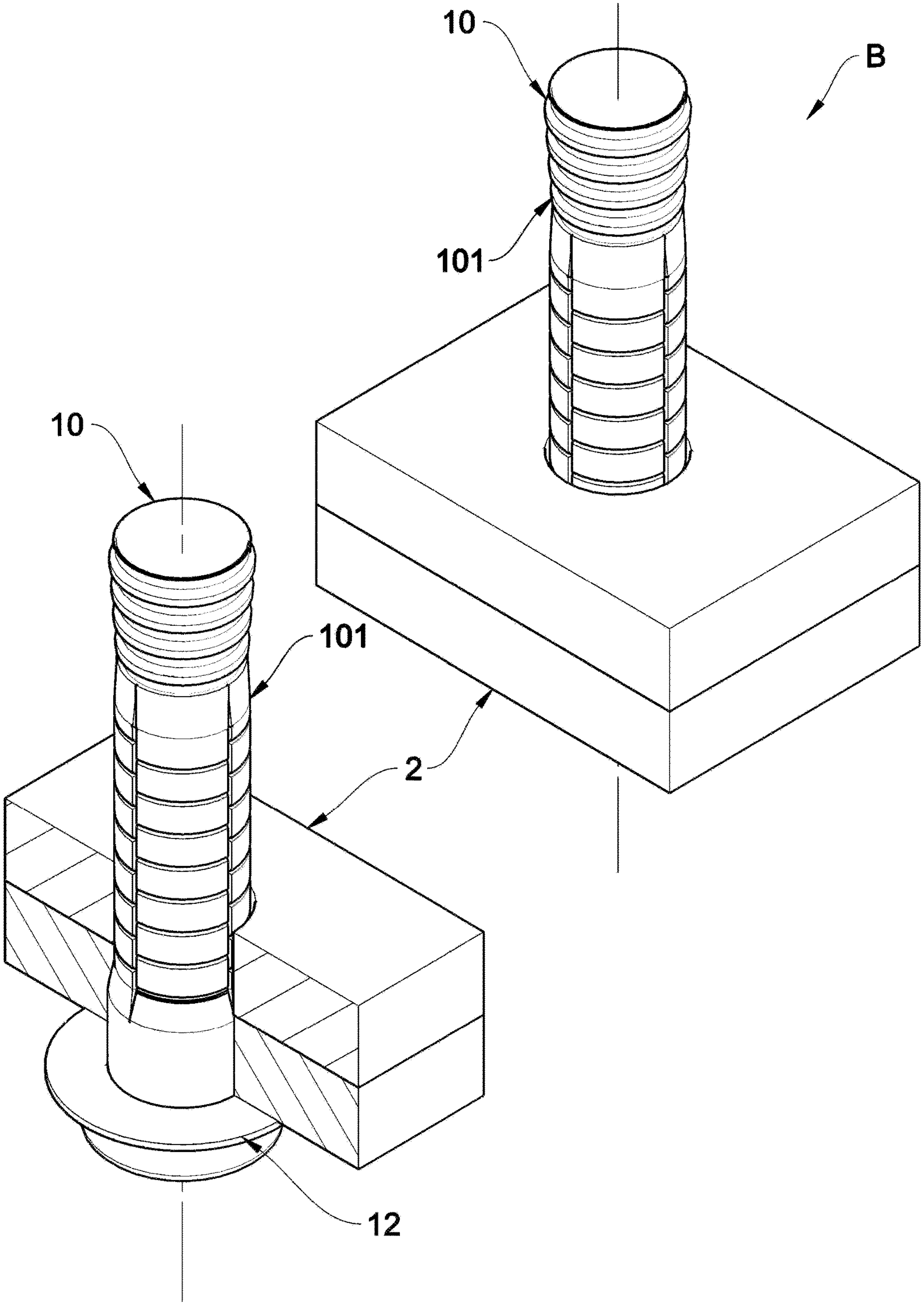
FIG. 13 is a schematic view of the preassembling step B of the second preferred embodiment of the invention.

Please refer to FIG. 12 and FIG. 13. Both FIG. 12 and FIG. 13 are a schematic view of the preassembling step B of the second preferred embodiment of the invention separately. As shown in FIG. 12 and FIG. 13, the preassembling step B of the second preferred embodiment of the invention is to vertically and upwardly insert the lockbolt 10 from the side of the shank 101, which faces the side of the circular arc surface of the magnetic washer having a circular arc angle 12, into the magnetic washer having a circular arc angle 12, to form the fastening assembly 1 of the invention. Next, the preassembled fastening assembly 1 is inserted vertically and upwardly into the pre-drilled hole of the object to be mounted 2 created from the drilling step A. Due to the use of the magnetic washer having a circular arc angle 12 with strong magnetism made by production, the lockbolt 10 with magnetic permeability by production can be attracted and attached on to the object to be mounted 2 through the strong magnetism generated by the magnetic washer having a circular arc angle 12. Because of the design of the magnetic washer having a circular arc angle 12, the preassembling step B of the second preferred embodiment of the invention can be a single-sided preassembling step and enhance the accessibility during field operations.

Figure 14:
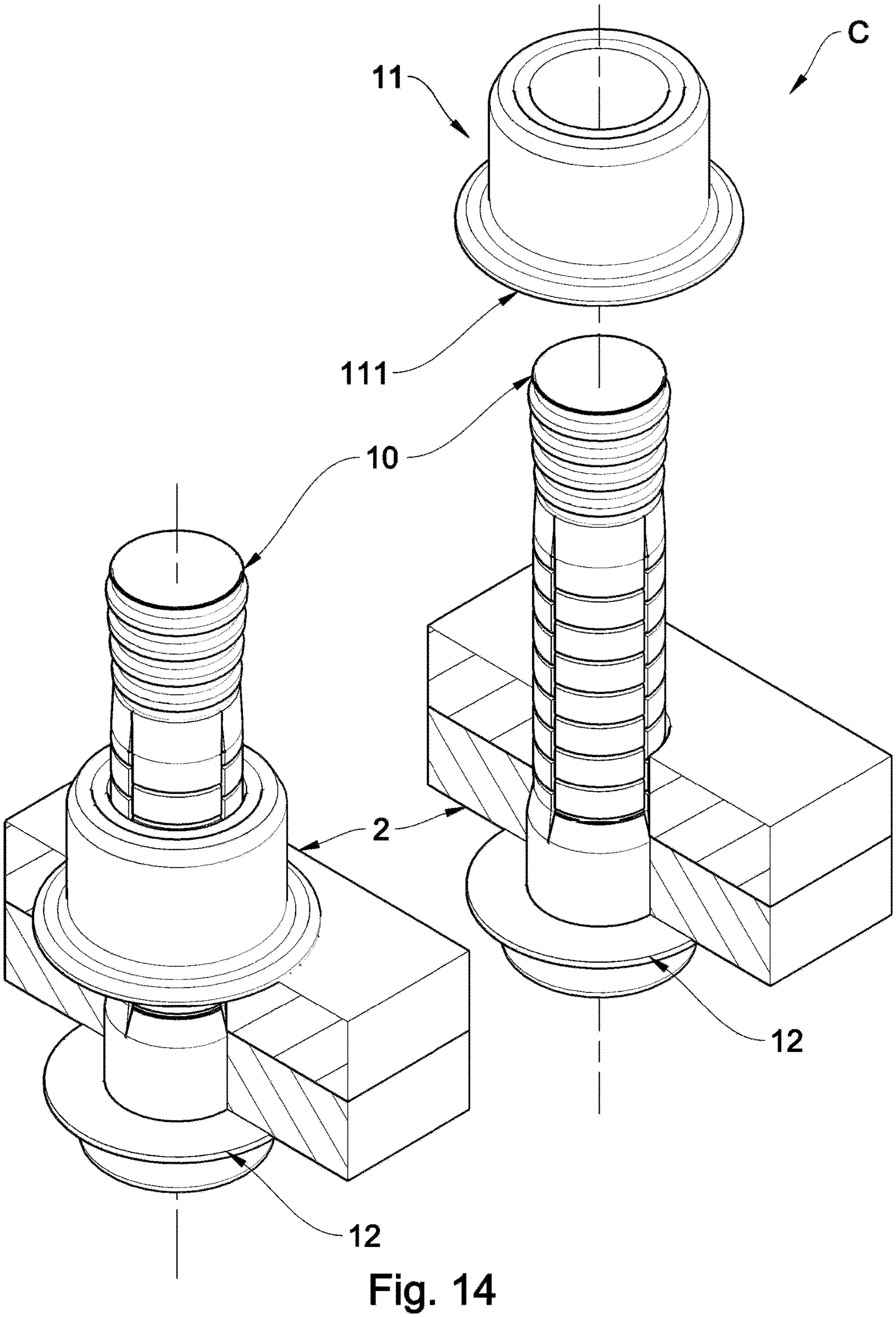
FIG. 14 is a schematic view of the installing step C of the second preferred embodiment of the invention.

Please refer to FIG. 14. FIG. 14 is a schematic view of the installing step C of the second preferred embodiment of the invention. As shown in FIG. 14, the installing step C of the second preferred embodiment of the invention is to insert the wage collar 11, having the protruding edge structure 111 at the end, into the lockbolt 10 after the preassembling step.

Figure 15:
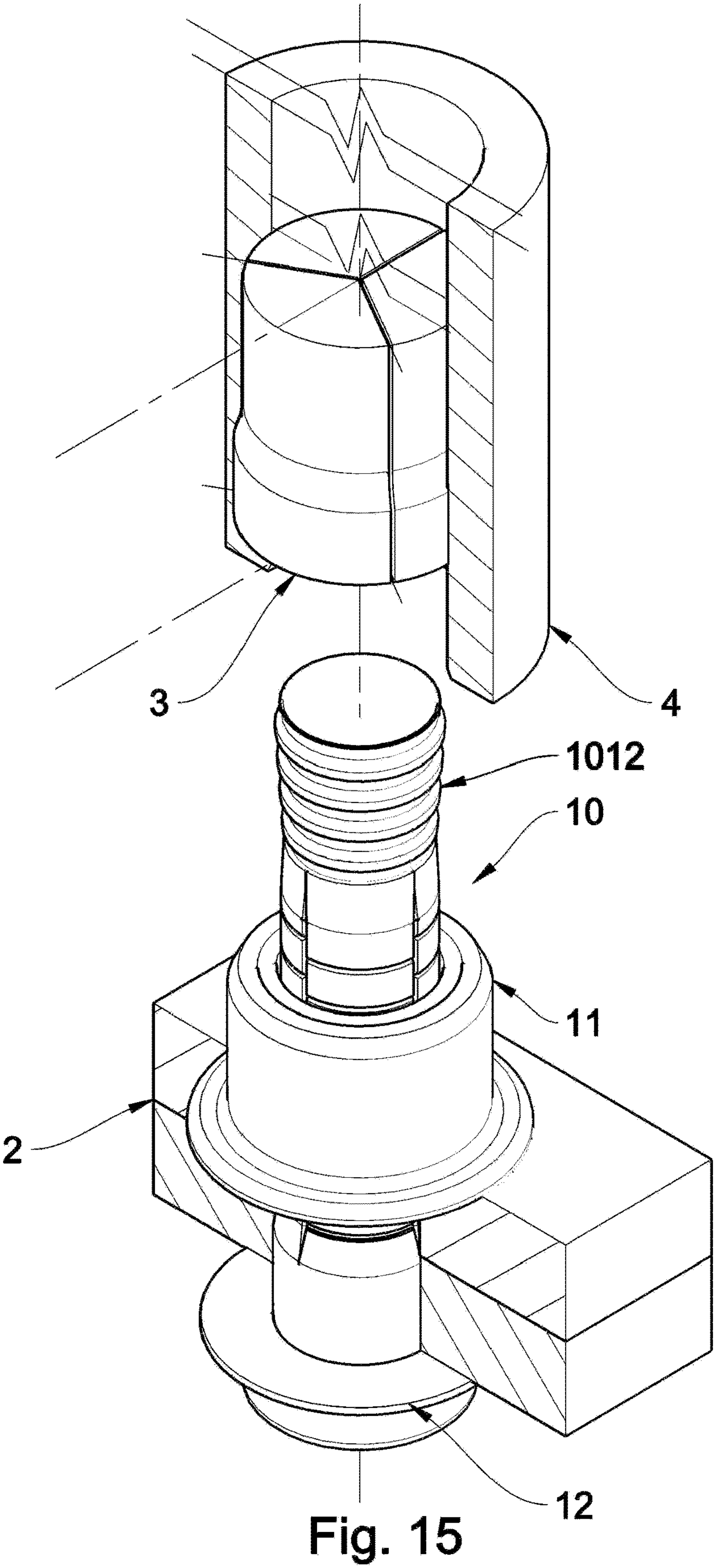
FIG. 15 is a schematic view of the gripping step D of the second preferred embodiment of the invention.
Figure 16:
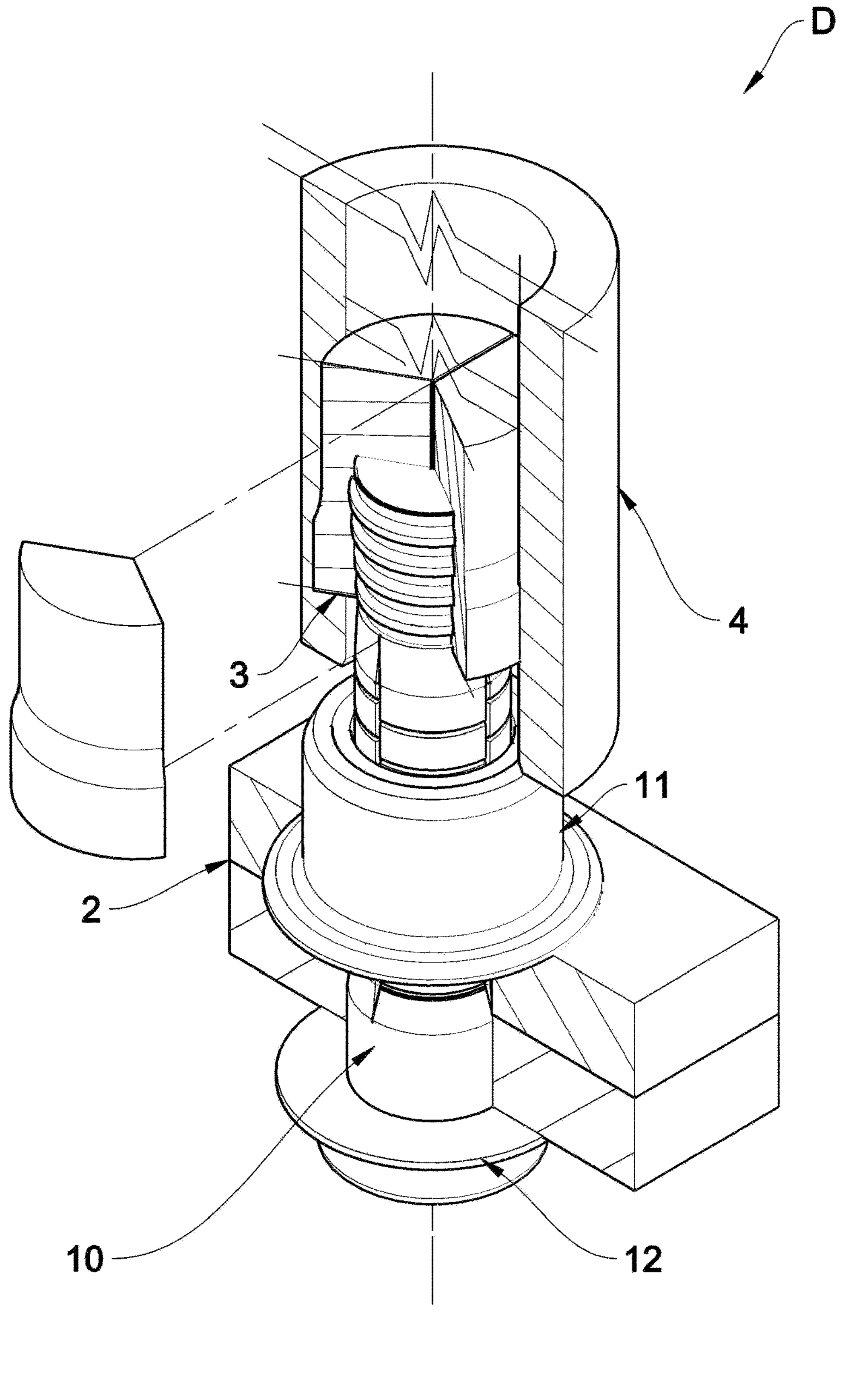
FIG. 16 is a schematic view of the gripping step D of the second preferred embodiment of the invention.

Please refer to FIG. 15 and FIG. 16. Both FIG. 15 and FIG. 16 are a schematic view of the gripping step D of the second preferred embodiment of the invention separately. As shown in FIG. 15 and FIG. 16, the gripping step D of the second preferred embodiment of the invention is to place a pull fixture 3 and a pull sleeve 4 onto the pull section having a reverse tapered surface 1012 of the lockbolt 10, described in the aforementioned installing step, to which the pull fixture 3 and the pull sleeve 4 hold on.

Figure 17:
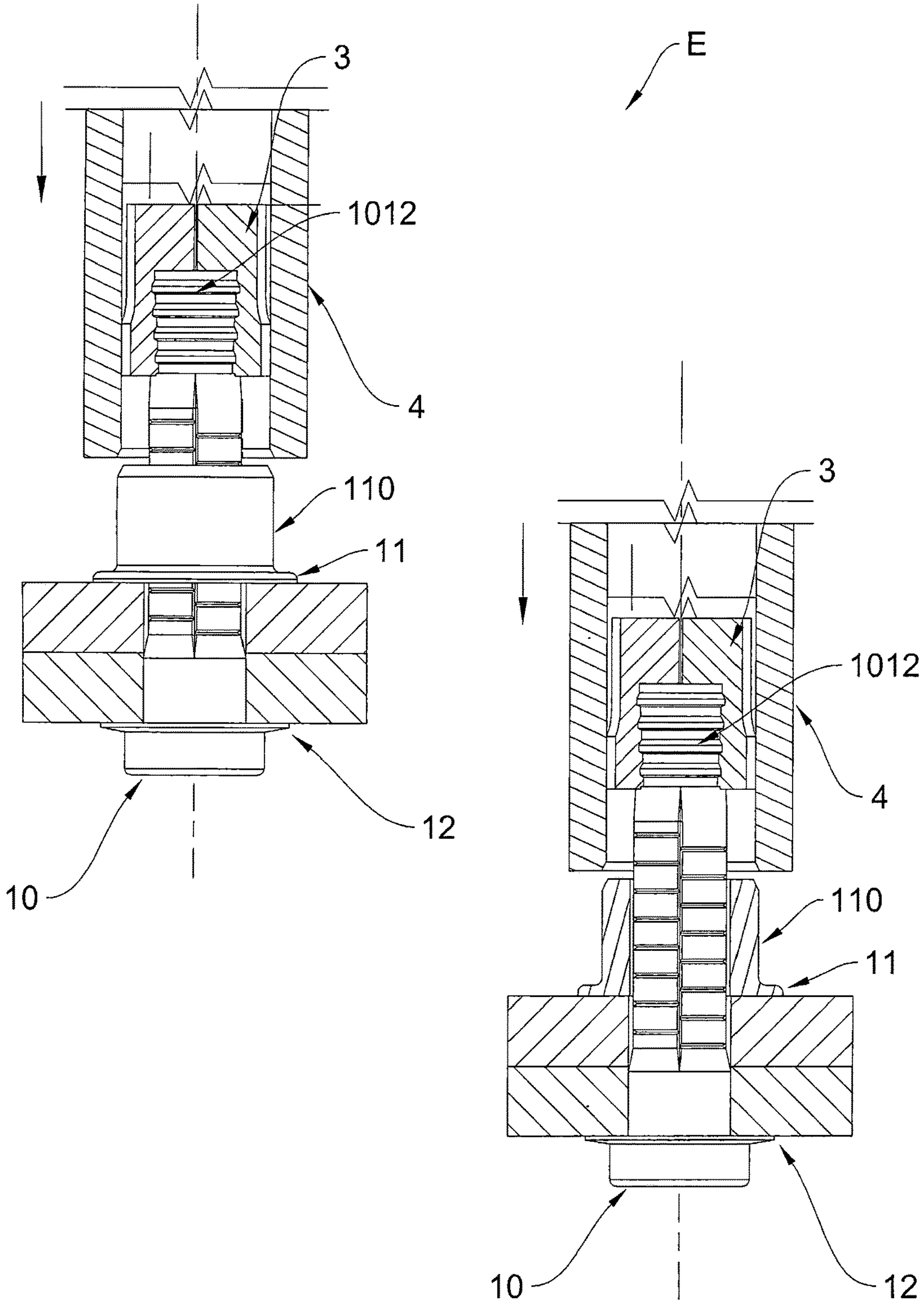
FIG. 17 is a schematic view of the pulling step E of the second preferred embodiment of the invention.
Figure 18:
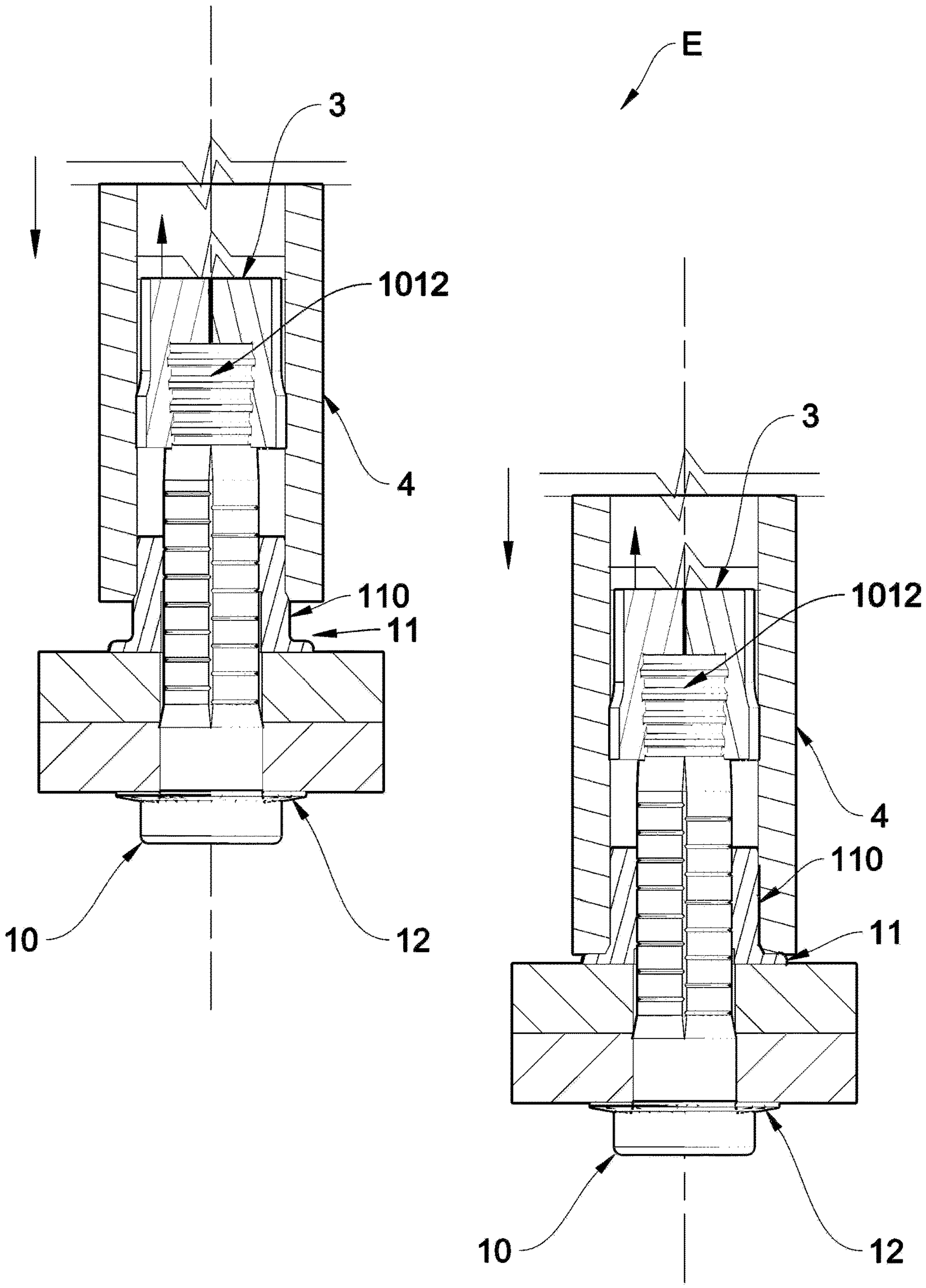
FIG. 18 is a schematic view of the pulling step E of the second preferred embodiment of the invention.

Please refer to FIG. 17 and FIG. 18. Both FIG. 17 and FIG. 18 are a schematic view of the pulling step E of the second preferred embodiment of the invention separately. As shown in FIG. 17 and FIG. 18, the pulling step E of the second preferred embodiment of the invention is to plug and secure the swage collar body 110 of the swage collar 11 of the fastening assembly 1 into the object to be mounted, which has been drilled with a through hole during the aforementioned drilling step A, by applying force in the axial direction toward the object to be mounted through the pull sleeve 4. At the same time, the pull fixture 3 is used to grip the pull section having a reverse tapered surface 1012 of the lockbolt and applies force in the opposite direction of the swage collar 11, causing strain effects of the swage collar body 110 of the swage collar 11 that eventually have the object to be mounted 2 securely fastened.

A fixture of a blind rivet, comprising a pull fixture and a pull sleeve, wherein the pull fixture comprises a set of 3-segment assembled parts, having an annular protruding edge structure on the inner surface thereof that can grip the pull section of the lockbolt; and the pull sleeve has a hollow sleeve structure and the pull fixture can be placed within the hollow sleeve structure of the pull sleeve; the pull sleeve is used in the pulling step E to apply force that causes strain effects of the rivet body making the object to be mounted securely fastened.

Figure 19:
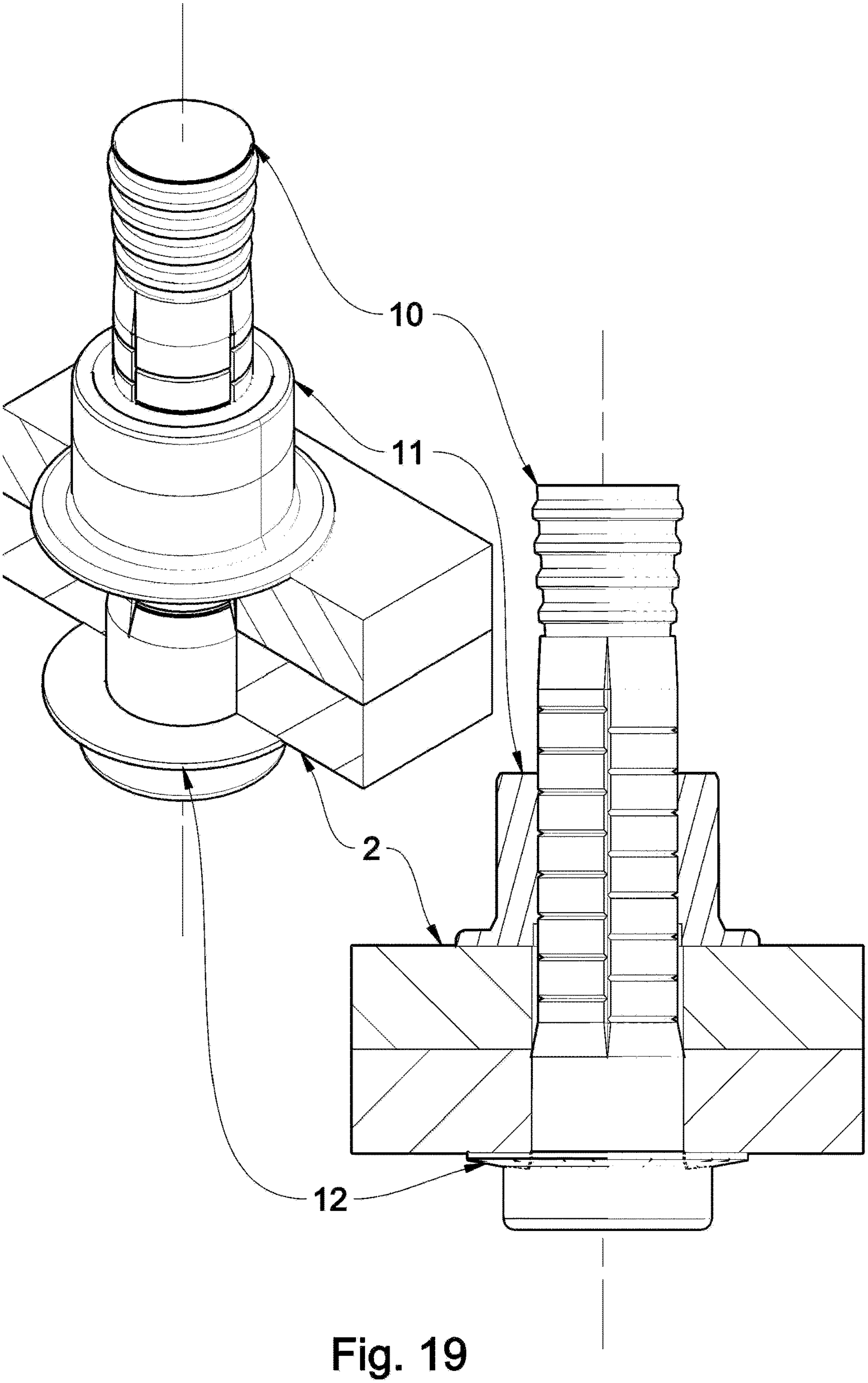
FIG. 19 is a schematic view upon completion of the pulling step E of the second preferred embodiment of the invention.

Please refer to FIG. 19. FIG. 19 is a schematic view upon completion of the pulling step E of the second preferred embodiment of the invention. As shown in FIG. 19, the fastening assembly 1 of the second preferred embodiment of the invention can be applied in securing objects to be mounted 2. According to FIG. 19, the fastening assembly 1 of the invention is a locking method for a permanent joint.

Figure 20:
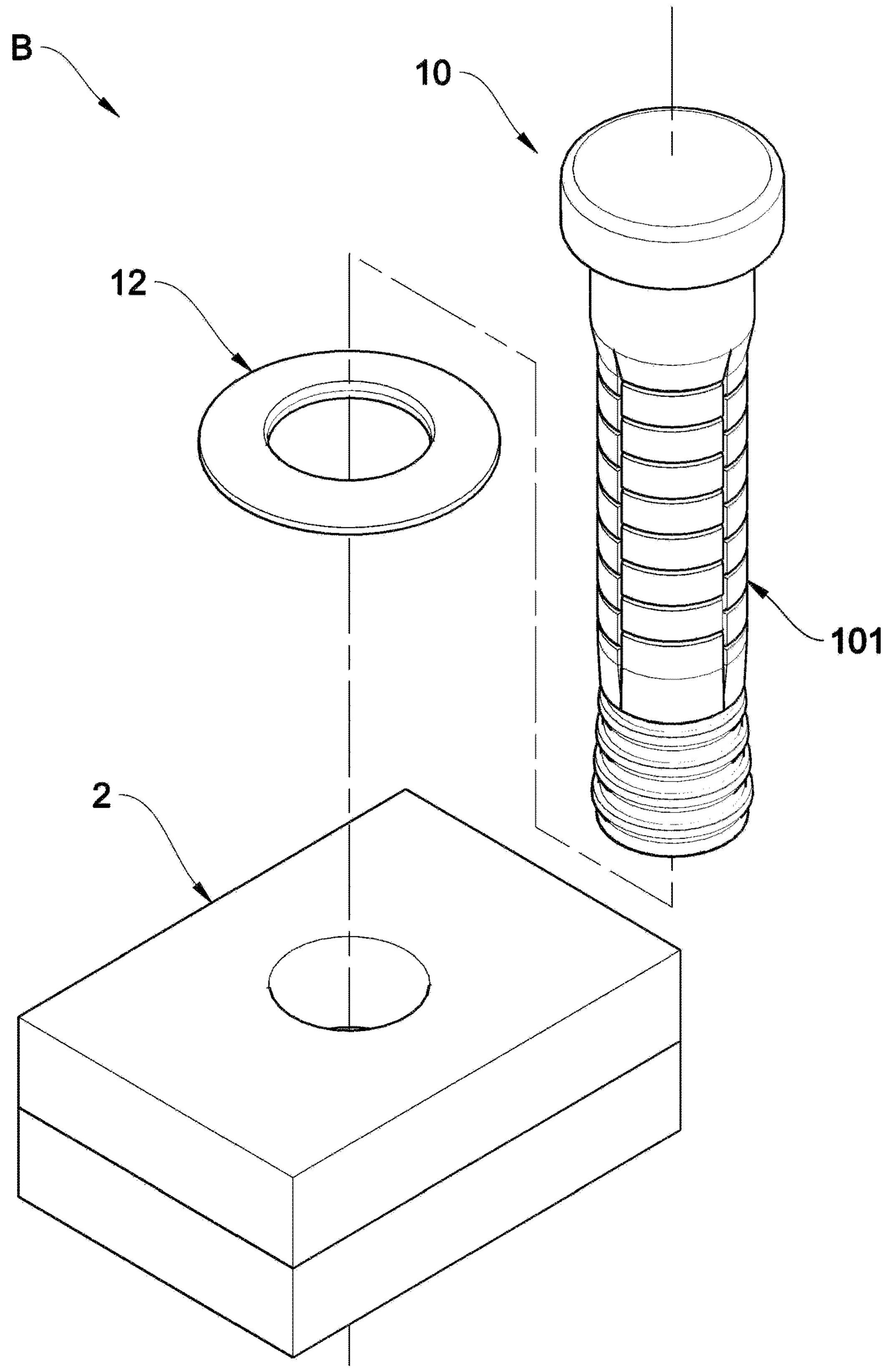
FIG. 20 is a schematic view of the preassembling step B of the third preferred embodiment of the invention.

Please refer to FIG. 20. FIG. 20 is a schematic view of the preassembling step B of the third preferred embodiment of the invention. As shown in FIG. 20, the preassembling step B of the third preferred embodiment of the invention is to vertically and downwardly insert the lockbolt 10 from the side of the shank 101, which faces the side of the circular arc surface of the magnetic washer having a circular arc angle 12, into the magnetic washer having a circular arc angle 12, to form the fastening assembly 1 of the invention. Next, the preassembled fastening assembly 1 is inserted vertically and downwardly into the pre-drilled hole of the object to be mounted 2 created from the drilling step A.

Figure 21:
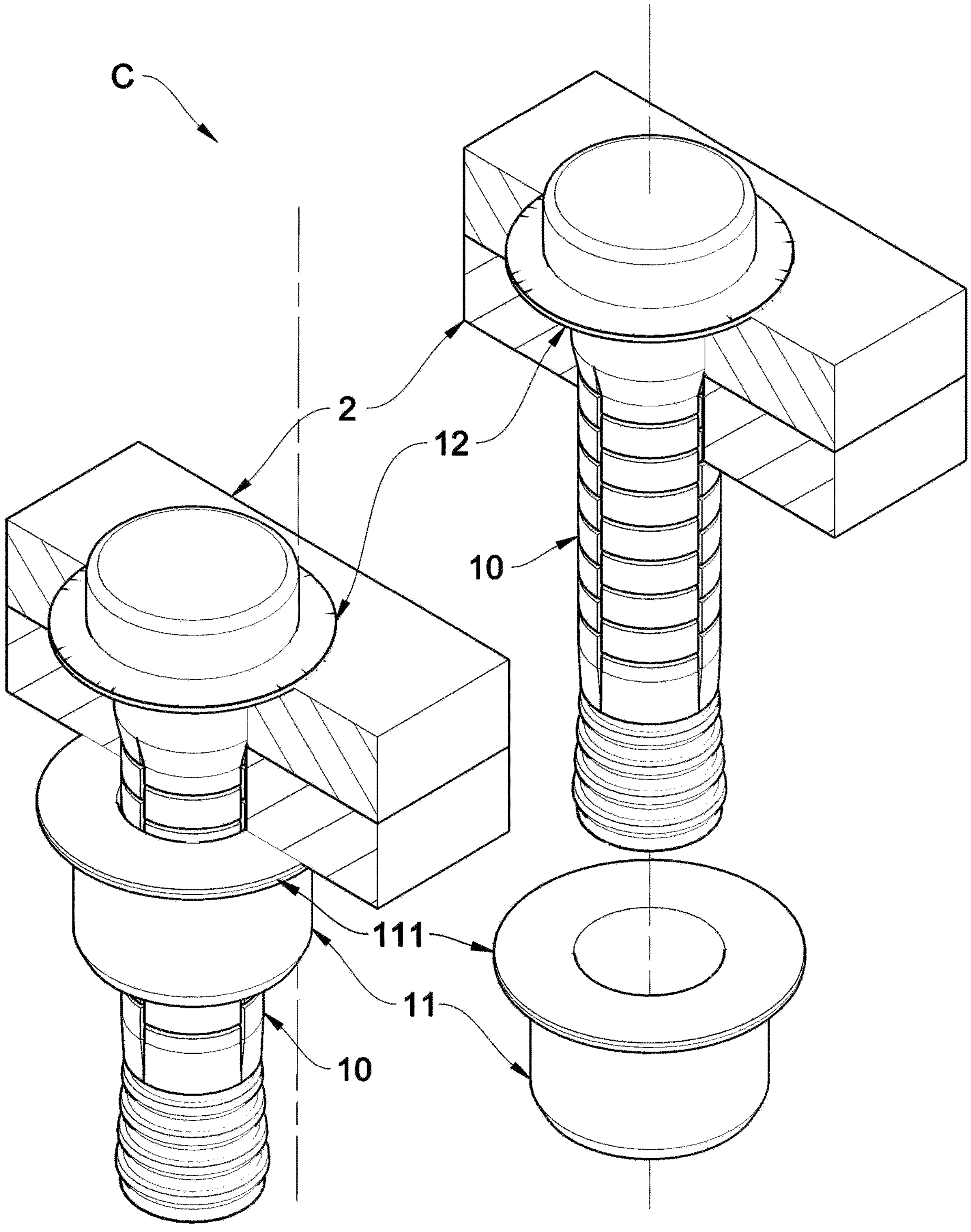
FIG. 21 is a schematic view of the installing step C of the third preferred embodiment of the invention.

Please refer to FIG. 21. FIG. 21 is a schematic view of the installing step C of the third preferred embodiment of the invention. As shown in FIG. 21, the installing step C of the third preferred embodiment of the invention is to insert the swage collar 11, having the protruding edge structure 111 at the end, into the lockbolt 10 after the preassembling step. Due to the use of the magnetic washer having a circular arc angle 12 with strong magnetism made by production, the lockbolt 10 and the swage collar 11 with magnetic permeability by production can be attracted and attached on to the object to be mounted 2 through the strong magnetism generated by the magnetic washer having a circular arc angle 12. Because of the design of the magnetic washer having a circular arc angle 12, the preassembling step B of the third preferred embodiment of the invention can preassemble the lockbolts 10 and the magnetic washers having a circular arc angle 12 onto the upper side of the object to be mounted 2 through a single-sided operation and then preassemble the rivet bodies 11 to the lower side of the object to be mounted 2. Through the strong magnetism of the magnetic washer having a circular arc angle 12, the swage collar 11 is automatically attached on to the object to be mounted 2 and therefore the accessibility during field operations is improved.

Figure 22:
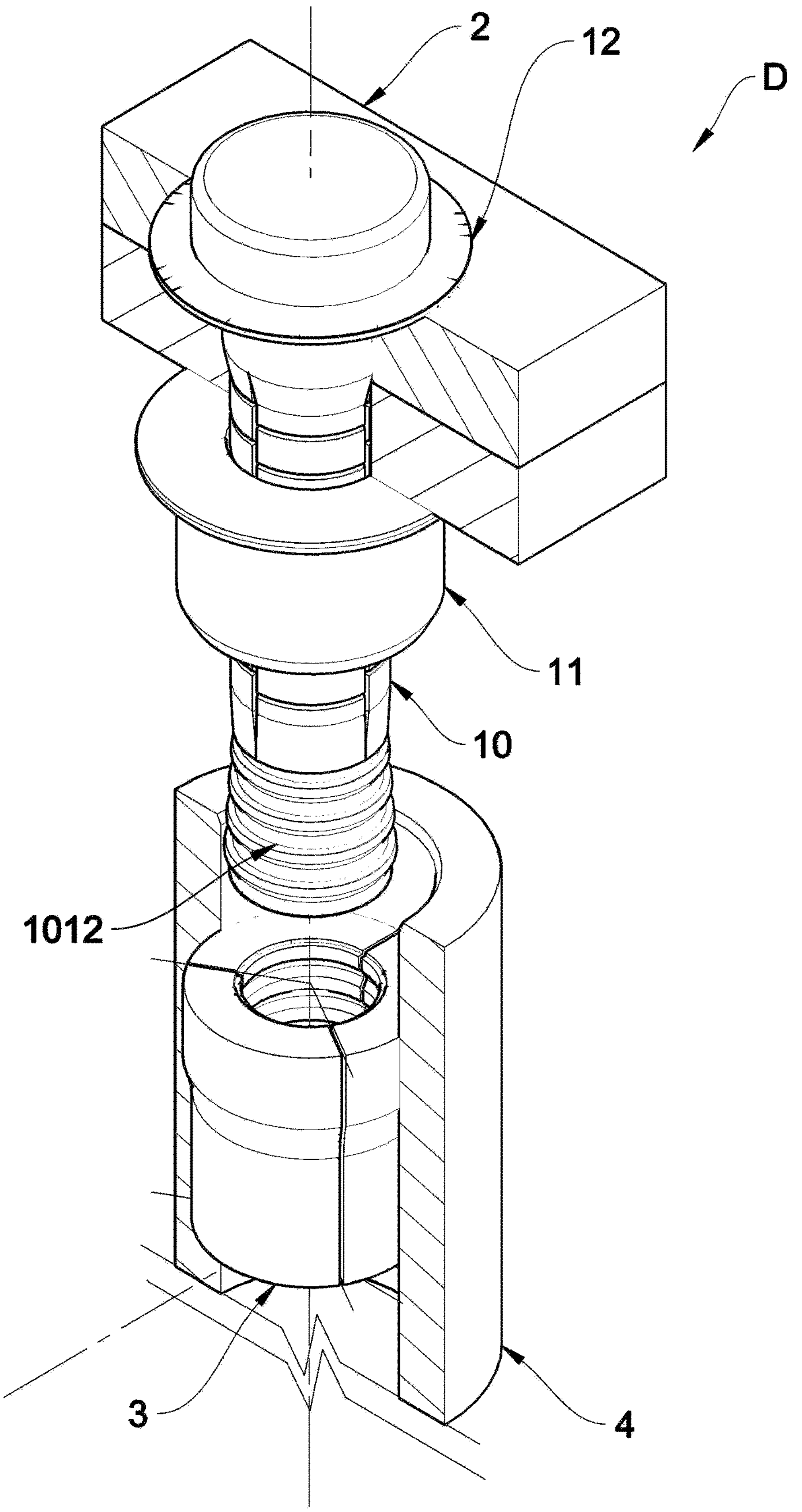
FIG. 22 is a schematic view of the gripping step D of the third preferred embodiment of the invention.
Figure 23:
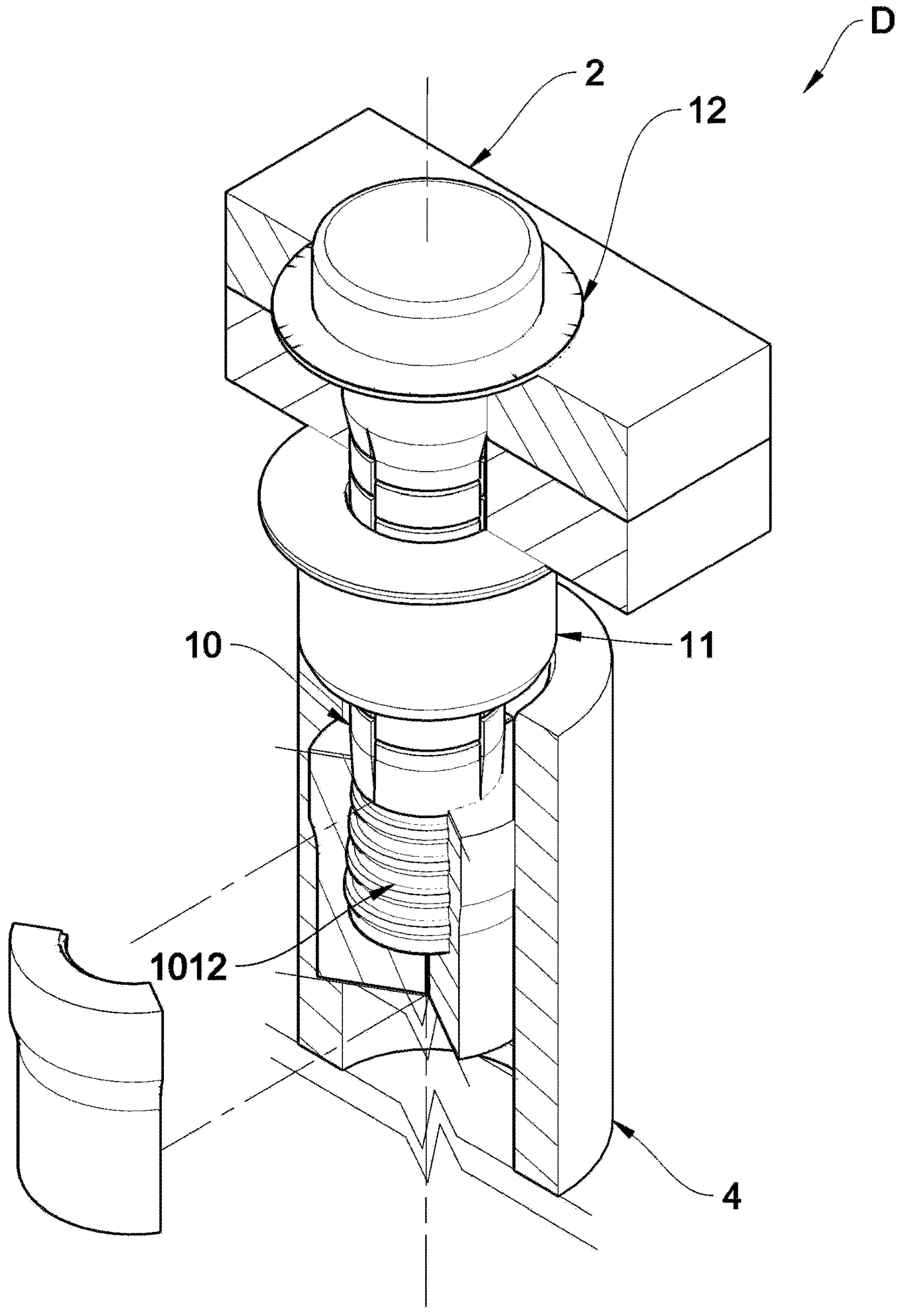
FIG. 23 is a schematic view of the gripping step D of the third preferred embodiment of the invention.

Please refer to FIG. 22 and FIG. 23. Both FIG. 22 and FIG. 23 are a schematic view of the gripping step D of the third preferred embodiment of the invention separately. As shown in FIG. 22 and FIG. 23, the gripping step D of the third preferred embodiment of the invention is to place a pull fixture 3 and a pull sleeve 4 onto the pull section having a reverse tapered surface 1012 of the lockbolt 10, described in the aforementioned installing step, to which the pull fixture 3 and the pull sleeve 4 hold on.

Figure 24:
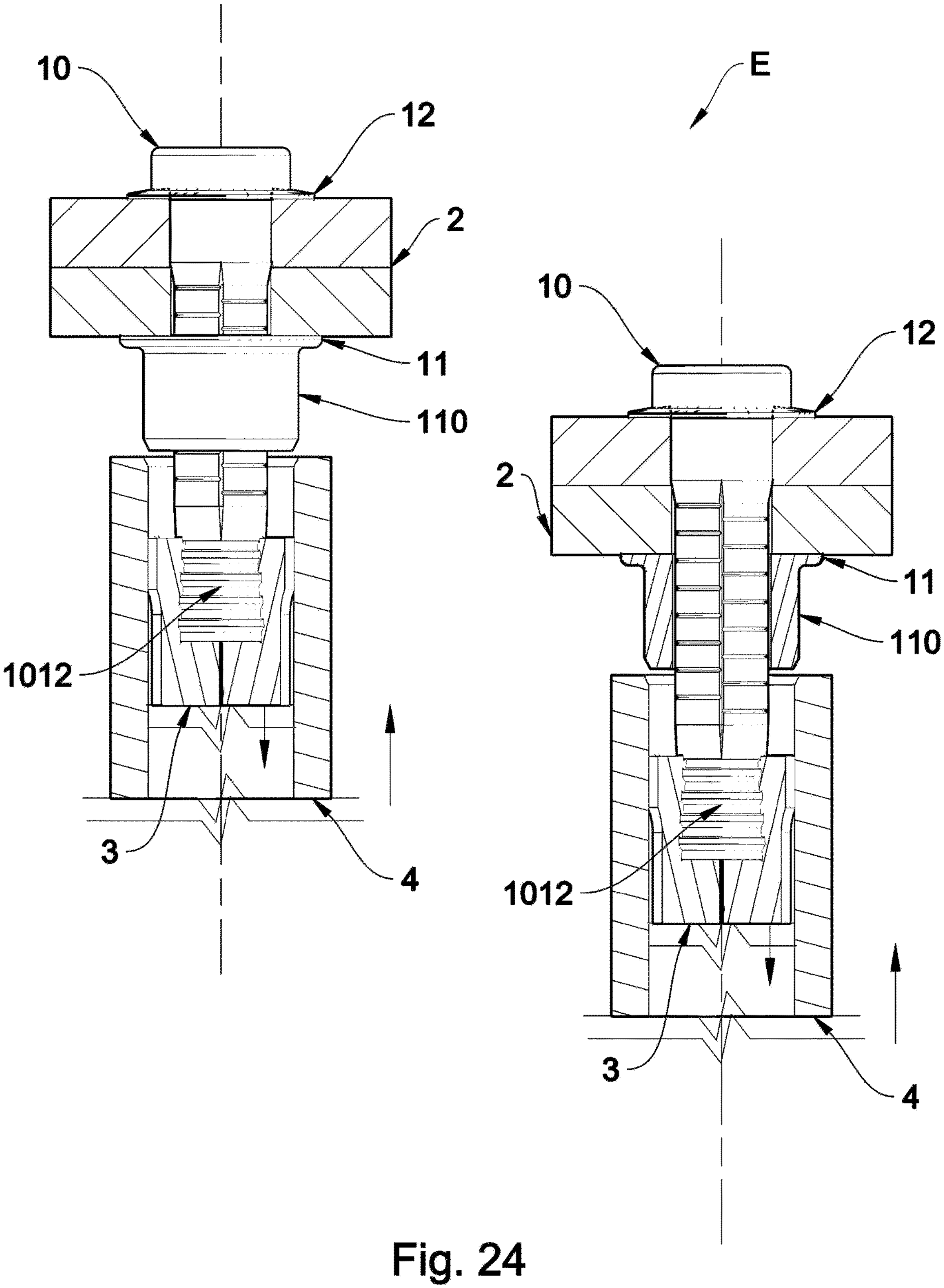
FIG. 24 is a schematic view of the pulling step E of the third preferred embodiment of the invention.
Figure 25:
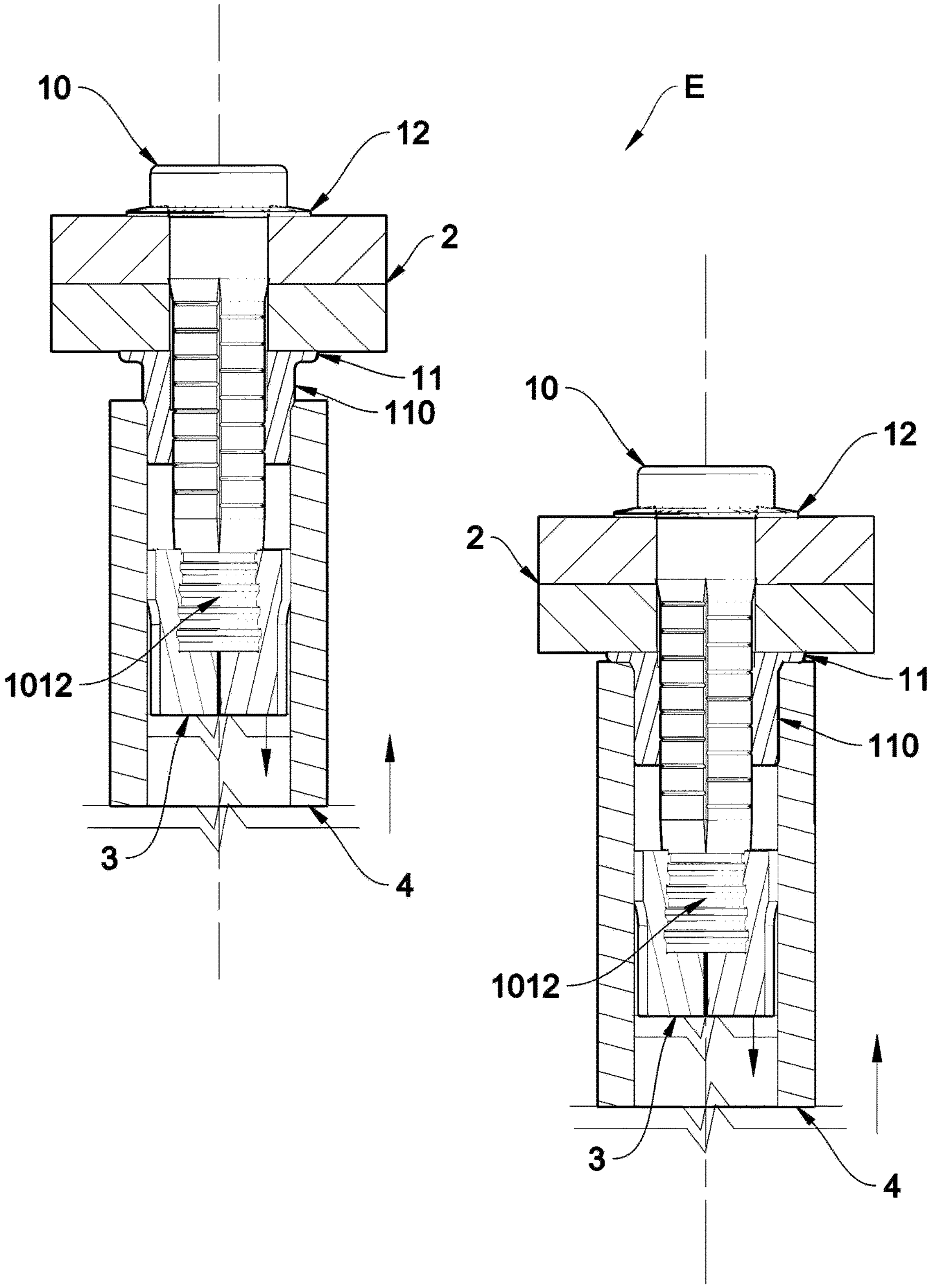
FIG. 25 is a schematic view of the pulling step E of the third preferred embodiment of the invention.

Please refer to FIG. 24 and FIG. 25. Both FIG. 24 and FIG. 25 are a schematic view of the pulling step E of the third preferred embodiment of the invention. As shown in FIG. 24 and FIG. 25, the pulling step E of the third preferred embodiment of the invention is to plug and secure the swage collar body 110 of the swage collar 11 of the fastening assembly 1 into the object to be mounted, which has been drilled with a through hole during the aforementioned drilling step A, by applying force in the axial direction toward the object to be mounted through the pull sleeve 4. At the same time, the pull fixture 3 is used to grip the pull section having a reverse tapered surface 1012 of the lockbolt and applies force in the opposite direction of the swage collar 11, causing strain effects of the swage collar body 110 of the swage collar 11 that eventually have the object to be mounted 2 securely fastened.

A fixture of a blind rivet, comprising a pull fixture and a pull sleeve, wherein the pull fixture comprises a set of 3-segment assembled parts, having an annular protruding edge structure on the inner surface thereof that can grip the pull section of the lockbolt; and the pull sleeve has a hollow sleeve structure and the pull fixture can be placed within the hollow sleeve structure of the pull sleeve; the pull sleeve is used in the pulling step E to apply force that causes strain effects of the rivet body making the object to be mounted securely fastened.

Figure 26:
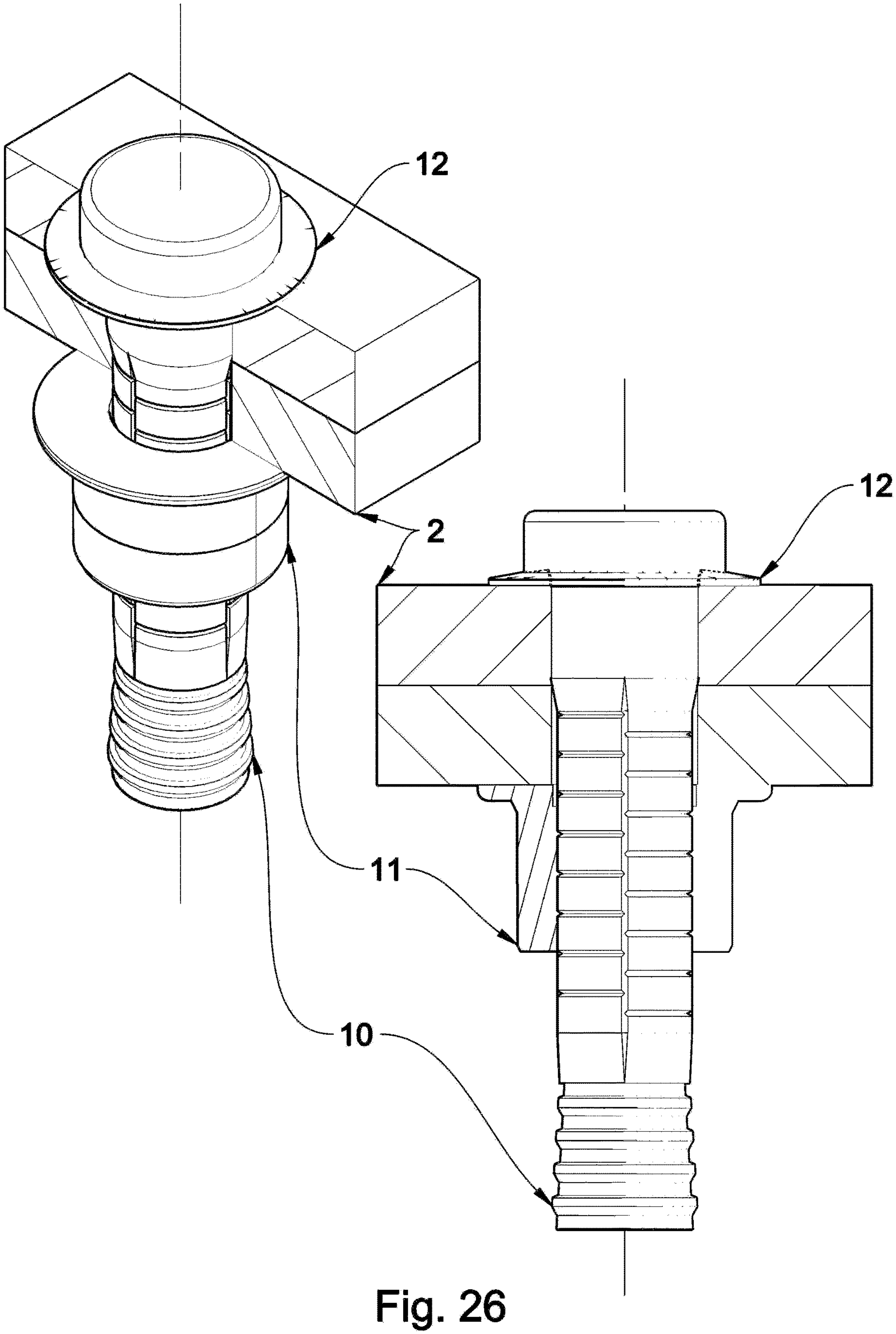
FIG. 26 is a schematic view upon completion of the pulling step of the third preferred embodiment of the invention.

Please refer to FIG. 26. FIG. 26 is a schematic view upon completion of the pulling step of the third preferred embodiment of the invention. As shown in FIG. 26, the fastening assembly 1 of the third preferred embodiment of the invention can be applied in securing objects to be mounted 2. According to FIG. 26, the fastening assembly 1 of the invention is a locking method for a permanent joint.

Figure 27:
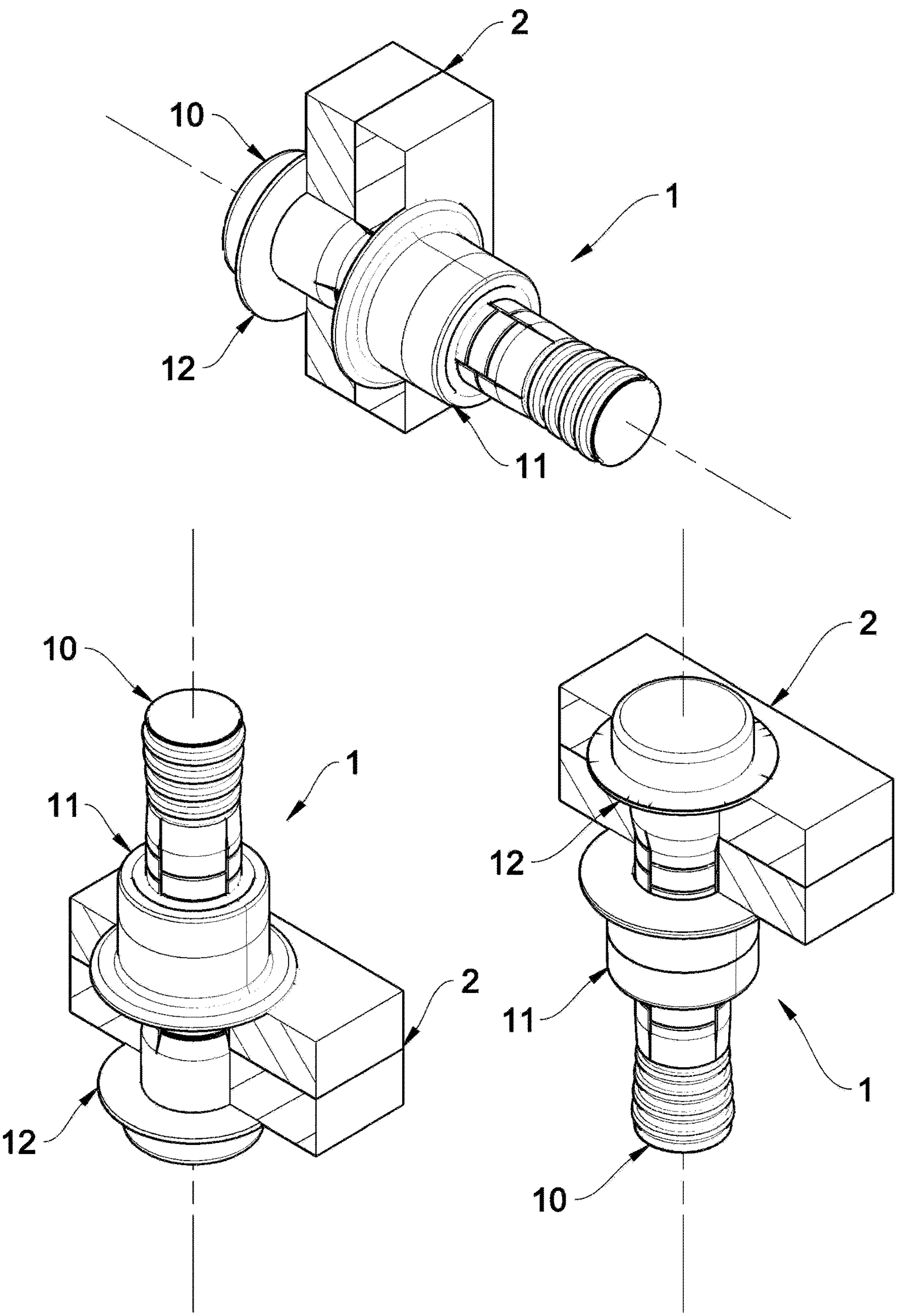
FIG. 27 is a schematic view upon completion of the pulling step of the first, second, and third preferred embodiments of the invention.

Please refer to FIG. 27. FIG. 27 is a schematic view upon completion of the pulling step of the first, second, and third preferred embodiments of the invention. As shown in FIG. 27, the fastening assembly 1 of the first, second, and third preferred embodiments of the invention can be applied in securing objects to be mounted 2. According to FIG. 27, the fastening assembly 1 of the invention is a locking method for a permanent joint.

The advantages of the invention are as follows:

The overall length of the lockbolt is reduced and, as a result, the production cost is effectively reduced. The pull section having a reverse tapered surface 1012 of the lockbolt 10 of the invention is a conical structure which has a reverse tapered surface angle of 3°-8°, and is configured with a structure of annular grooves having a reverse tapered surface 10120, wherein the annular grooves having a reverse tapered surface 10120 can increase the gripping force during the pulling process. Owing to such a design, the length of the pull section having a reverse tapered surface 1012 can be reduced while the gripping force of the pull section having a reverse tapered surface 1012 of the lockbolt 10 remains unchanged. As a result, the overall length, of the lockbolt 10 is reduced and the production cost is also reduced effectively.

The design of the mandrel of the invention has the effect of reducing stress. According to the invention, the groove section 1011 of the shank 101 of the lockbolt 10 is disposed on the shank 101 and connected with the grip section 1010; the diameter of the groove section 1011 can be d-d/8-d-d/16; the groove section 1011 is configured with offset-style radial annular groove portions 10111 and an axial line-style slot structure 10112 separately, wherein the axial line-style slot structure 10112 has four air slots that are 900 apart and the groove depth of the groove section 1011 can be d/48-d/32. Through the axial line-style slot structure 10112 having four air slots that are 90° apart, the lockbolt of the invention has the effect of reducing stress.

The fastening assembly, which is paired with the magnetic washer having a circular arc angle, can be used in settings of various directions. The magnetic washer having a circular arc angle 12 of the invention takes the advantage of its own strong magnetism made by production, along with the use of lockbolts 10 and swage collars 11 with magnetic permeability, to be applied to objects to be mounted that are not horizontal to the gravity direction during the preassembling step B and the installing step C. The fastening assembly 1 is secured firmly on to the object to be mounted 2 during steps of the single-sided operations through the magnetic washer having a circular arc angle 12.

While the invention has been described in terms of preferred embodiments, those skilled in the art will recognize that the invention can be practiced with modifications within the spirit and scope of the appended claims.

What is claimed is:

1. A fastening assembly, comprising a lockbolt, a swage collar, and a magnetic washer having a circular arc angle, wherein:

the lockbolt comprises a lockbolt head and a shank having a diameter of d, the shank including a grip section, a groove section, and a pull section having a reverse tapered surface; the lockbolt head is connected to one side of the grip section; and an end surface of the lockbolt head is connected to one side of the shank and has a circular arc surface with a radius of R;

the grip section is a portion of the shank close to the lockbolt head;

the groove section is disposed on the shank and connected to the grip section;

the groove section has a diameter of d-d/8 to d-d/16;

the groove section is configured with offset-style radial annular groove portions and a separate axial line-style slot structure; the separate axial line-style slot structure has four air slots that are 90° apart; and the groove section has a groove depth of d/48 to d/32;

the pull section having the reverse tapered surface is disposed on the shank and connected to the groove section; the pull section having the reverse tapered surface that is a conical structure, which has a reverse tapered surface angle of 3° to 8°, and is configured with a structure of annular grooves having the reverse tapered surface;

the structure of the annular grooves having the reverse tapered surface increases the gripping force during a pulling process; a length of the pull section having the reverse tapered surface is reduced while the gripping force of the pull section having the reverse tapered surface remains unchanged; the overall length of the lockbolt is reduced; and a production cost is also reduced;

the swage collar comprises a through hole that matches and is plugged with the lockbolt, a swage collar body, and a protruding edge structure; and the magnetic washer having the circular arc angle has a through hole that matches and fits onto the lockbolt; one side of the magnetic washer has the circular arc surface with a radius of R that engages and joins with the circular arc surface with the radius R of the lockbolt head; and the magnetic washer is configured to calibrate a deviation, caused by an eccentric force created during the pulling step, through the circular arc surface of the radius R thereof.

2. The fastening assembly of claim 1, wherein the magnetic washer having the circular arc angle has strong magnetism made by production.

3. The fastening assembly of claim 1, wherein the lockbolt and the swage collar have magnetic permeability made by production.

* * * * *